(12) United States Patent
Sakai

(10) Patent No.: US 10,893,160 B2
(45) Date of Patent: Jan. 12, 2021

(54) MULTI-FEED DETECTION APPARATUS FOR CHANGING A THRESHOLD VALUE FOR DETECTING MULTI-FEED OR STOPPING DETECTION OF MULTI-FEED BASED ON A SHAPE OF A MEDIUM

(71) Applicant: PFU LIMITED, Kahoku (JP)

(72) Inventor: Masaaki Sakai, Kahoku (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/667,737

(22) Filed: Oct. 29, 2019

(65) Prior Publication Data

US 2020/0204695 A1 Jun. 25, 2020

(30) Foreign Application Priority Data

Dec. 20, 2018 (JP) .................................. 2018-238597

(51) Int. Cl.
*H04N 1/00* (2006.01)

(52) U.S. Cl.
CPC ....... *H04N 1/00713* (2013.01); *H04N 1/0071* (2013.01); *H04N 1/00729* (2013.01); *H04N 1/00745* (2013.01)

(58) Field of Classification Search
CPC ............ B65H 2220/01; B65H 2220/02; B65H 2220/11; B65H 2511/20; B65H 2511/212; B65H 2511/33; B65H 2515/704; B65H 2220/04; B65H 2405/1136; B65H 2405/141; B65H 2557/64; B65H 3/06; B65H 3/0661; B65H 3/0669; B65H 3/56; B65H 7/02; G06K 9/00442; G06K 9/00456; G06K 9/4642; G06K 9/346; G06K 9/40; G06K 9/4604; H04N 1/00045; H04N 1/00005; H04N 1/00037; H04N 1/00068;
(Continued)

(56) References Cited

U.S. PATENT DOCUMENTS

2007/0152396 A1* 7/2007 Tanahashi ................ B65H 7/02
271/109
2008/0193180 A1* 8/2008 Shim ...................... B41J 11/003
399/395
(Continued)

FOREIGN PATENT DOCUMENTS

JP 2012-253414 A 12/2012
JP 2013-63843 A 4/2013

*Primary Examiner* — Negussie Worku
(74) *Attorney, Agent, or Firm* — Lewis Roca Rothgerber Christie LLP

(57) ABSTRACT

A multi-feed detection apparatus includes a conveyance roller, an ultrasonic sensor for generating an ultrasonic signal, an imaging device to image the medium being conveyed by the conveyance roller and sequentially generate a line image, and a processor to detect a width of the medium in each line image for each line image, detect a vertex count of a medium included in the sequentially generated line image based on the width of the media in the each line image, detect a length of the medium in a direction perpendicular to the medium width, estimate a shape of a medium based on the vertex count and the length of the medium, and detecting media multi-feed by comparing the ultrasonic signal with a predetermined threshold value, and change the predetermined threshold value or stop detection of the medium multi-feed, based on the estimated shape of the medium.

15 Claims, 17 Drawing Sheets

(58) Field of Classification Search
CPC ........... H04N 1/00074; H04N 1/00092; H04N
1/00602; H04N 1/00684; H04N 1/00729;
H04N 1/00771; H04N 1/00777; H04N
1/00832; H04N 1/00909; H04N 1/02815;
H04N 1/193; H04N 1/32657; H04N
2201/0094; H04N 1/00029; H04N
1/4076; H04N 1/4097; H04N 1/60; H04N
5/2171; H04N 5/357; H04N 5/3675;
G03G 15/6511; G03G 2215/00751; G06T
1/00; G06T 5/005; G06T 7/001; G06T
2207/10008
USPC ........................................................ 358/498
See application file for complete search history.

(56) References Cited

U.S. PATENT DOCUMENTS

| | | | |
|---|---|---|---|
| 2013/0069299 A1 | 3/2013 | Matsuoka et al. | |
| 2017/0374214 A1* | 12/2017 | Kanamitsu | B65H 3/0653 |
| 2018/0220022 A1* | 8/2018 | Yoshikaie | H04N 1/00734 |
| 2018/0259883 A1* | 9/2018 | Takano | G03G 15/5025 |
| 2018/0343361 A1* | 11/2018 | Okada | H04N 1/00774 |
| 2019/0135564 A1* | 5/2019 | Machida | B65H 3/0607 |
| 2019/0281170 A1* | 9/2019 | Yokogawa | H04N 5/2171 |
| 2019/0281182 A1* | 9/2019 | Kanaya | H04N 1/00037 |
| 2019/0281186 A1* | 9/2019 | Kanaya | H04N 1/4076 |
| 2019/0342461 A1* | 11/2019 | Honda | H04N 1/00729 |
| 2019/0344987 A1* | 11/2019 | Osawa | B65H 7/125 |
| 2019/0344988 A1* | 11/2019 | Osawa | G01N 29/27 |
| 2019/0376932 A1* | 12/2019 | Suzuki | G01S 15/08 |
| 2020/0198908 A1* | 6/2020 | Shimosaka | B65H 3/0661 |

\* cited by examiner

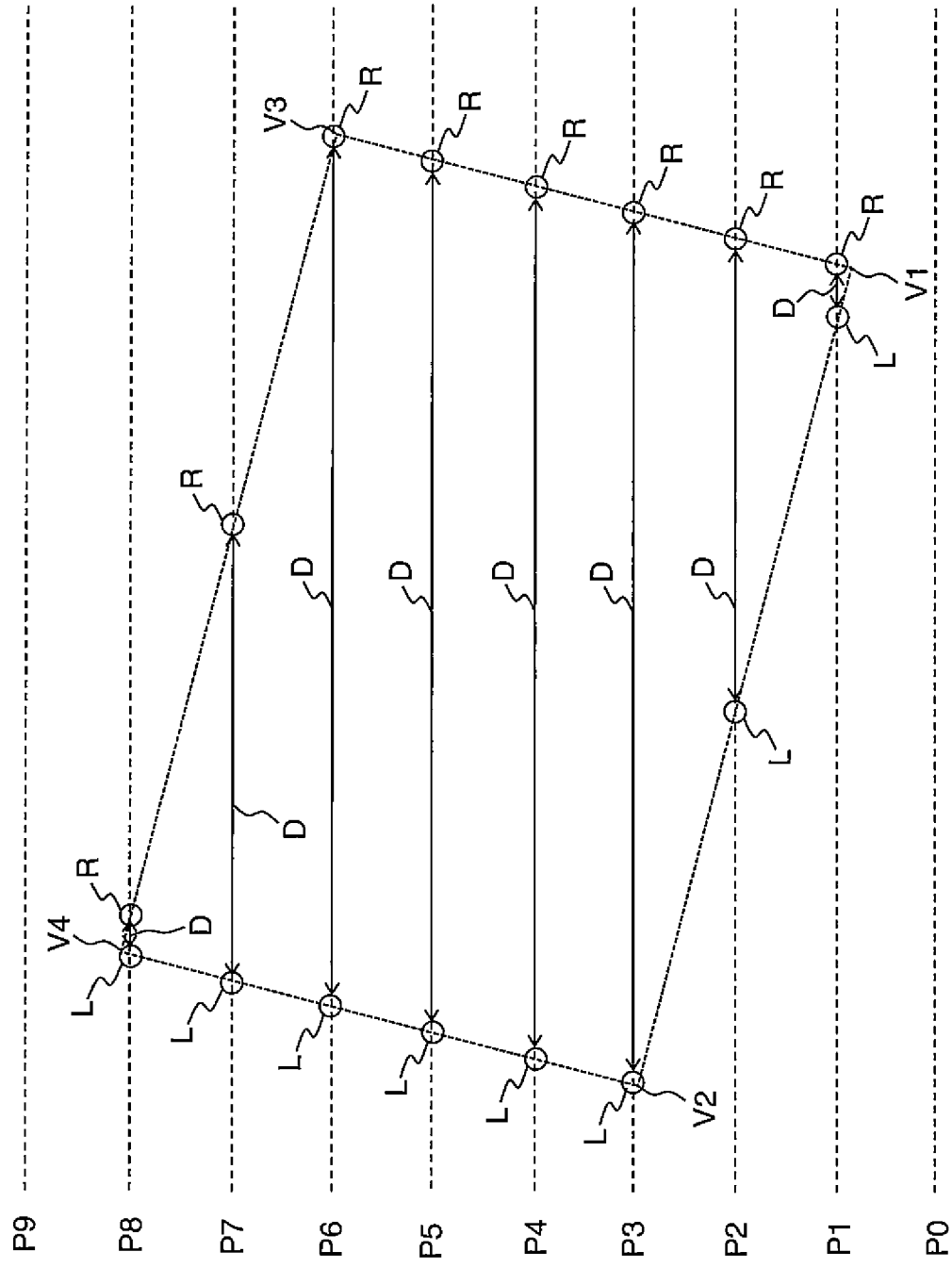

MULTI-FEED DETECTION APPARATUS FOR CHANGING A THRESHOLD VALUE FOR DETECTING MULTI-FEED OR STOPPING DETECTION OF MULTI-FEED BASED ON A SHAPE OF A MEDIUM

CROSS-REFERENCE TO RELATED APPLICATIONS

This application is based upon and claims the benefit of priority of prior Japanese Patent Application No. 2018-238597, filed on Dec. 20, 2018, the entire contents of which are incorporated herein by reference.

Embodiments discussed in the present specification relate to detect multi-feed.

BACKGROUND

A device, such as a scanner, conveying a medium such as a document and reading an image of the conveyed medium has a function of detecting whether or not multi-feed, that is, a plurality of media being conveyed in an overlapped manner is occurring. In general, a multi-feed detection apparatus such as a scanner includes an ultrasonic transmitter for transmitting an ultrasonic wave and an ultrasonic receiver for outputting a signal corresponding to a received ultrasonic wave, and detects multi-feed based on a signal output by the ultrasonic receiver when a medium is conveyed.

However, a reception level of an ultrasonic wave when a plastic card is conveyed as a medium is close to a reception level of an ultrasonic wave when multi-feed of paper is occurring, and when such a card is conveyed, occurrence of multi-feed may be mistakenly determined.

A medium conveying device for detecting whether or not multi-feed of media conveyed on a conveyance path exists, based on an output of an ultrasonic sensor including an ultrasonic transmitter and an ultrasonic receiver located to face one another with the conveyance path of a medium in between is disclosed (see Japanese Unexamined Patent Publication (Kokai) No. 2013-63843). Based on a difference in a length of a side between a first medium and a second medium conveyed on the conveyance path, the medium conveying device discriminates between the first medium and the second medium, and detects existence or nonexistence of multi-feed of media further based on the discrimination result.

An image reading device for detecting multi-feed of documents based on image data acquired by reading a document conveyed on a conveyance path is disclosed (see Japanese Unexamined Patent Publication (Kokai) No. 2012-253414). The image reading device estimates a length of a document from image data and determines that multi-feed of documents exists when an edge is detected at a position apart from the front edge of the document by a length of the document, and also another edge is detected within a range in which a distance from the position apart by the length of the document is less than a conveyance interval of the document.

SUMMARY

According to some embodiments, a multi-feed detection apparatus includes a conveyance roller to convey a medium, an ultrasonic sensor including an ultrasonic transmitter for transmitting an ultrasonic wave and an ultrasonic receiver facing the ultrasonic transmitter for receiving the ultrasonic wave through the medium and generating an ultrasonic signal corresponding to the received ultrasonic wave, an imaging device to image the medium being conveyed by the conveyance roller and sequentially generate a line image, and a processor to detect a width of the medium in each line image for each line image, detect a vertex count of a medium included in the sequentially generated line image based on the width of the media in the each line image, detect a length of the medium in a direction perpendicular to the medium width, estimate a shape of a medium based on the vertex count and the length of the medium, and detecting media multi-feed by comparing the ultrasonic signal with a predetermined threshold value, and change the predetermined threshold value or stop detection of the medium multi-feed, based on the estimated shape of the medium.

According to some embodiments, a method for detecting media multi-feed includes conveying a medium by a conveyance roller, transmitting an ultrasonic wave by an ultrasonic transmitter, receiving the ultrasonic wave through the medium and generating an ultrasonic signal corresponding to the received ultrasonic wave by an ultrasonic receiver facing the ultrasonic transmitter, generating an ultrasonic signal corresponding to a received ultrasonic wave, imaging the medium being conveyed by the conveyance roller and sequentially generating a line image by an imaging device, detecting a width of the medium in each line image for each line image, detecting a vertex count of a medium included in the sequentially generated line image based on the width of the medium in the each line image, detecting a length of the medium in a direction perpendicular to the medium width, estimating a shape of a medium based on the vertex count and the length of the medium, detecting media multi-feed by comparing the ultrasonic signal with a predetermined threshold value, and changing the predetermined threshold value or stopping detection of the media multi-feed, based on the estimated shape of the medium.

According to some embodiments, a computer program causes a multi-feed detection apparatus including a conveyance roller to convey a medium, an ultrasonic sensor including an ultrasonic transmitter for transmitting an ultrasonic wave and an ultrasonic receiver facing the ultrasonic transmitter for receiving the ultrasonic wave through the medium and generating an ultrasonic signal corresponding to the received ultrasonic wave, and an imaging device to image the medium being conveyed by the conveyance roller and sequentially generate a line image, to execute a process including detecting a width of the medium in each line image for each line image, detecting a vertex count of a medium included in the sequentially generated line image based on the width of the medium in the each line image, detecting a length of the medium in a direction perpendicular to the medium width, estimating a shape of a medium based on the vertex count and the length of the medium, detecting media multi-feed by comparing the ultrasonic signal with a predetermined threshold value, and changing the predetermined threshold value or stopping detection of the media multi-feed, based on the estimated shape of the medium.

BRIEF DESCRIPTION OF DRAWINGS

FIG. 10 is a schematic diagram for illustrating the relation between a change in a medium width and a vertex count.

DESCRIPTION OF EMBODIMENTS

It is to be understood that both the foregoing general description and the following detailed description are exemplary and explanatory, and are not restrictive of the invention, as claimed.

Hereinafter, a multi-feed detection apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
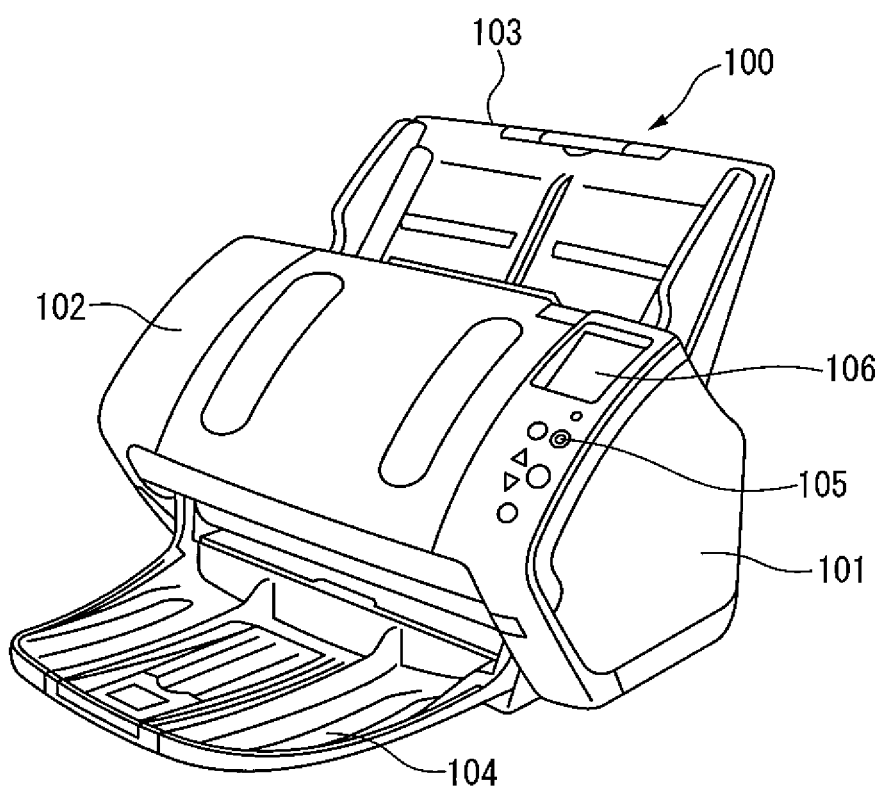
FIG. 1 is a perspective view illustrating a multi-feed detection apparatus 100 according to an embodiment.

FIG. 1 is a perspective view illustrating a multi-feed detection apparatus 100 configured as an image scanner. The multi-feed detection apparatus 100 conveys and images a medium being a document. A medium is paper, thick paper, a card, a brochure, a passport, etc. For example, a card is a plastic resin card. Particularly, a card is an identification (ID) card defined by International Organization for Standardization (ISO)/International Electrotechnical Commission (IEC) 7810. A card may be another type of card. The multi-feed detection apparatus 100 may be a fax machine, a copying machine, a multifunctional peripheral (MFP), etc.

The multi-feed detection apparatus 100 includes a lower housing 101, an upper housing 102, a medium tray 103, an ejection tray 104, an operation device 105, and a display device 106.

The upper housing 102 is located in a position covering a top surface of the multi-feed detection apparatus 100, and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
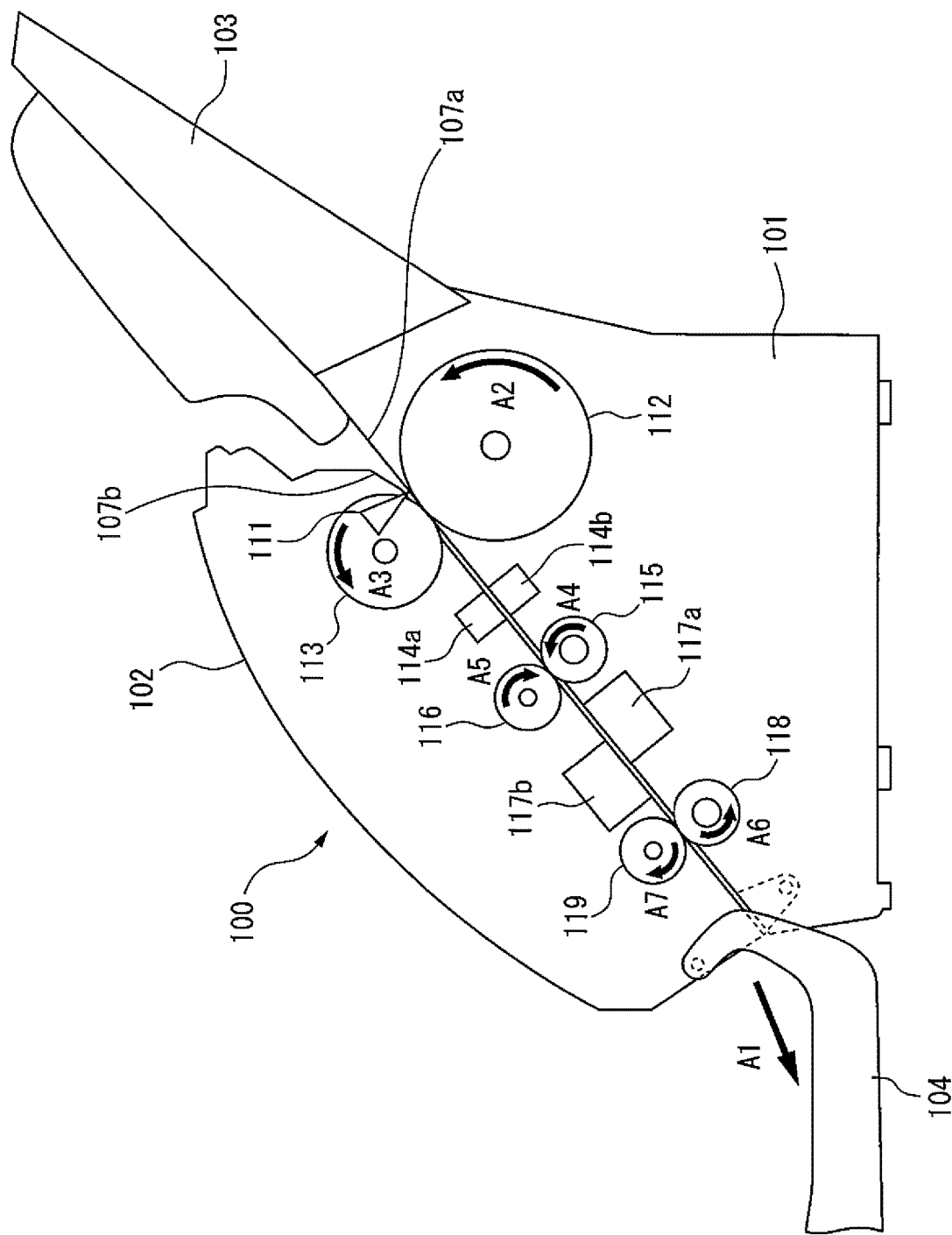
FIG. 2 is a diagram for illustrating a conveyance path inside the multi-feed detection apparatus 100.

FIG. 2 is a diagram for illustrating a conveyance path inside the multi-feed detection apparatus 100.

The conveyance path inside the multi-feed detection apparatus 100 includes a medium detection sensor 111, a feed roller 112, a brake roller 113, an ultrasonic transmitter 114a, an ultrasonic receiver 114b, a first conveyance roller 115, a second conveyance roller 116, a first imaging device 117a, a second imaging device 117b, a third conveyance roller 118, and a fourth conveyance roller 123, etc. The numbers of each roller is not limited to one, and may be plural.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The medium detection sensor 111 includes a contact detection sensor and detects whether or not a medium is placed on the medium tray 103. The medium detection sensor 111 generates and outputs a medium detection signal changing the signal value between a state in which a medium is placed on the medium tray 103 and a state in which a medium is not placed.

The ultrasonic transmitter 114a and the ultrasonic receiver 114b are examples of an ultrasonic transmission module and an ultrasonic reception module, respectively. The ultrasonic transmitter 114a and the ultrasonic receiver 114b are provided on the downstream side of the feed roller 112 and the brake roller 113, and also on the upstream side of the first conveyance roller 115 and the second conveyance roller 116, that is, on the upstream side of the first imaging device 117a and the second imaging device 117b. The ultrasonic transmitter 114a and the ultrasonic receiver 114b are located close to the conveyance path of a medium in such a way as to face one another with the conveyance path in between. The ultrasonic transmitter 114a outputs an ultrasonic wave. On the other hand, the ultrasonic receiver 114b receives an ultrasonic wave being transmitted by the ultrasonic transmitter 114a and passing through a medium, and generates and outputs an ultrasonic signal being an electric signal corresponding to the received ultrasonic wave. The ultrasonic transmitter 114a and the ultrasonic receiver 114b may be hereinafter collectively referred to as an ultrasonic sensor 114.

The first imaging device 117a includes a reduction optical system type line sensor including an imaging element based on charge coupled devices (CCDs) linearly located in a main scanning direction. Further, the first imaging device 117a includes a lens for forming an image on the imaging element, and an A/D converter for amplifying and analog-digital (A/D) converting an electric signal output from the imaging element. The first imaging device 117a images the back side of a medium being conveyed by the feed roller 112, the brake roller 113, the first conveyance roller 115, and the second conveyance roller 116. The first imaging device 117a sequentially generates and outputs a line image acquired by imaging an area of a conveyed medium facing the line sensor, at certain intervals. Specifically, a pixel count of a line image in a vertical direction (subscanning direction) is 1, and a pixel count in a horizontal direction (main scanning direction) is greater than 1.

Similarly, the second imaging device 117b is an example of an imaging module and includes a reduction optical system type line sensor including an imaging element based on CCDs linearly located in the main scanning direction. Further, the second imaging device 117b includes a lens for forming an image on the imaging element, and an A/D converter for amplifying and A/D converting an electric signal output from the imaging element. The second imaging device 117b images the front side of a medium being conveyed by the feed roller 112, the brake roller 113, the first conveyance roller 115, and the second conveyance roller 116. The second imaging device 117b sequentially generates and outputs a line image acquired by imaging an area of a conveyed medium facing the line sensor, at certain intervals.

Only either of the first imaging device 117a and the second imaging device 117b may be located in the multi-feed detection apparatus 100 and only one side of a medium may be read. Further, a unity-magnification optical system type contact image sensor (CIS) including an imaging element based on a complementary metal oxide semiconductor (CMOS) may be used in place of the imaging element based on CCDs. The first imaging device 117a and the second imaging device 117b may be collectively referred to as imaging devices 117. The imaging device 117 is an example of imaging module.

A medium placed on the medium tray 103 is conveyed between the lower guide 107a and the upper guide 107b in the medium conveying direction A1 by the feed roller 112 rotating in a direction of an arrow A2 in FIG. 2. When a medium is conveyed, the brake roller 113 rotate in a direction of an arrow A3. By the workings of the feed rollers 112 and the brake roller 113, when a plurality of media are placed on the medium tray 103, only a medium in contact with the feed roller 112, out of the media placed on the medium tray 103, is separated. Consequently, the multi-feed detection apparatus 100 operates in such a way that conveyance of a medium other than the separated medium is restricted (prevention of multi-feed).

A medium is fed between the first conveyance roller 115 and the second conveyance roller 116 while being guided by the lower guide 107a and the upper guide 107b. The medium is fed between the first imaging device 117a and the second imaging device 117b by the first conveyance roller 115 and the second conveyance roller 116 rotating in directions of an arrow A4 and an arrow A5, respectively. The medium read by the imaging devices 117 is ejected on the ejection tray 104 by the third conveyance roller 118 and the fourth conveyance roller 119 rotating in directions of an arrow A6 and an arrow A7, respectively. The feed roller 112, the brake roller 113, the first conveyance roller 115, and the second conveyance roller 116 are examples of a conveying module for conveying a medium.

Figure 3:
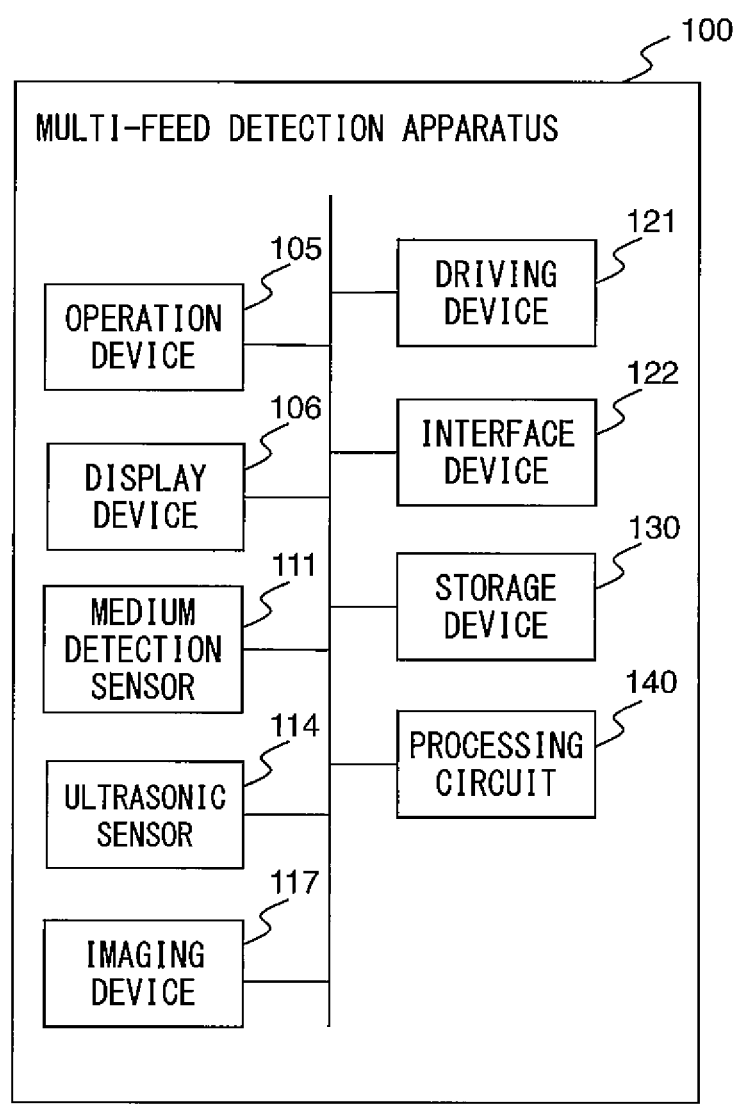
FIG. 3 is a block diagram illustrating a schematic configuration of the multi-feed detection apparatus 100.

FIG. 3 is a block diagram illustrating a schematic configuration of the multi-feed detection apparatus 100.

The multi-feed detection apparatus 100 further includes a driving device 121, an interface device 122, a storage device 130, and a processing circuit 140, etc., in addition to the configuration described above.

The driving device 121 includes one or a plurality of motors, and conveys a medium by rotating the feed roller 112, the brake roller 113, and the first to fourth conveyance rollers 115, 116, 118, and 119, by a control signal from the processing circuit 140.

For example, the interface device 122 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 122. For example, the predetermined communication protocol is a wireless local area network (LAN).

The storage device 130 includes a memory device such as a random access memory (RAM) or a read only memory (ROM), a fixed disk device such as a hard disk, or a portable storage device such as a flexible disk or an optical disk. Further, the storage device 130 stores a computer program, a database, a table, etc., used for various types of processing in the multi-feed detection apparatus 100. The computer program may be installed on the storage device 130 from a computer-readable, non-transitory medium such as a compact disk read only memory (CD-ROM), a digital versatile disk read only memory (DVD-ROM), etc., by using a well-known setup program, etc.

For example, the processing circuit 140 is a processor, such as a central processing unit (CPU). The processing circuit 140 operates in accordance with a program previously stored in the storage device 130. The processing circuit 140 may be a digital signal processor (DSP), a large scale integration (LSI), an application specific integrated circuit (ASIC), a field-programmable gate array (FPGA), etc.

The processing circuit 140 is connected to the operation device 105, the display device 106, the medium detection sensor 111, the ultrasonic sensor 114, the imaging devices 117, the driving device 121, the interface device 122, the storage device 130, the processing circuit 150, etc., and controls each of these units. The processing circuit 140 performs drive control of the driving device 121, imaging control of the imaging devices 117, etc., acquires an image, and transmits the image to an unillustrated information processing device through the interface device 142. Further, the processing circuit 140 detects multi-feed of conveyed media based on an ultrasonic signal generated by the ultrasonic sensor 114 and a line image imaged by the imaging device 117.

The processing circuit 150 executes predetermined image processing on an image imaged by the imaging device 117 and stores the image on which the image processing is executed into the storage device 130. A DSP, an LSI, an ASIC, an FPGA, etc., may be used in place of the processing circuit 150.

Figure 4:
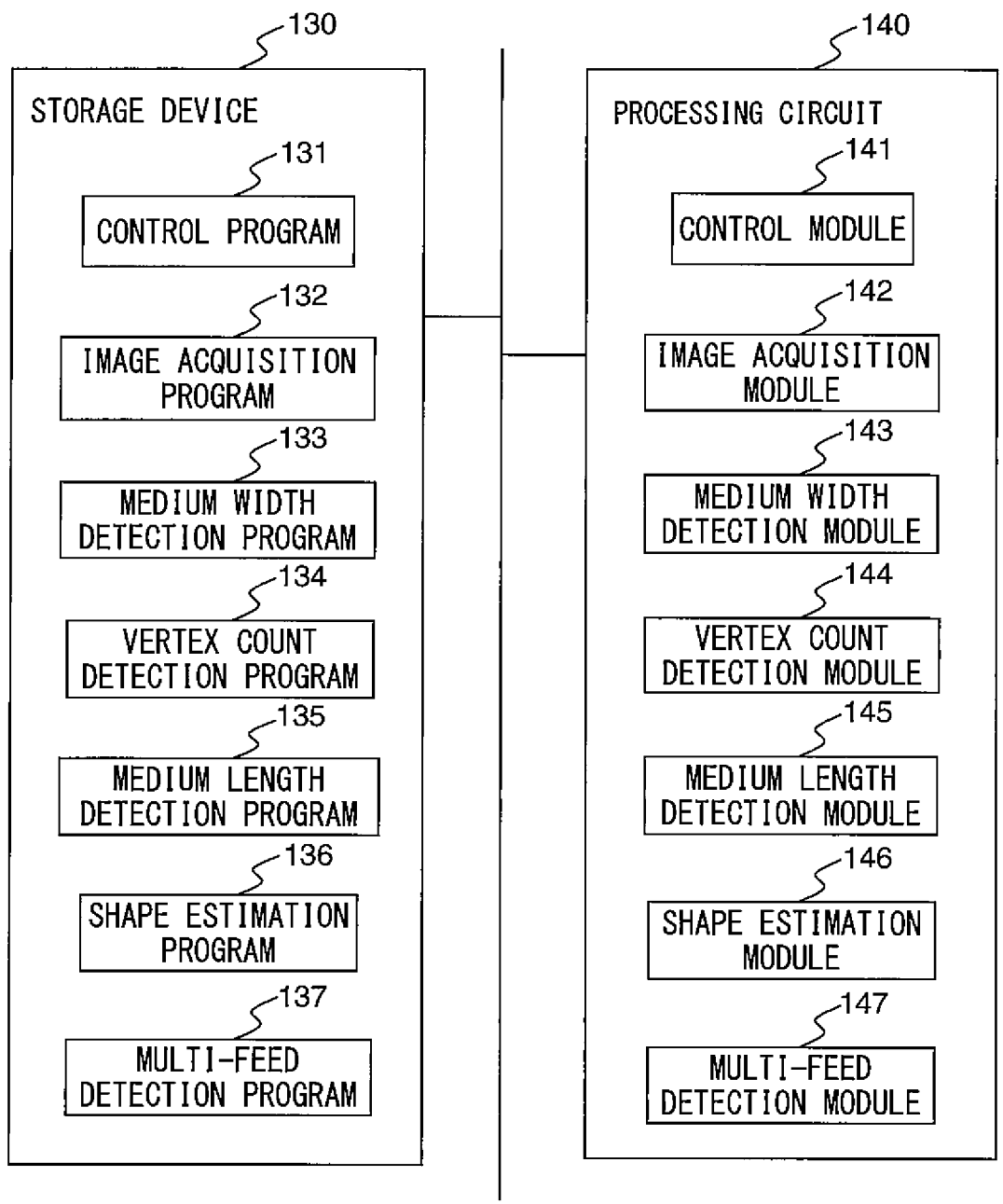
FIG. 4 is a diagram illustrating a schematic configuration of a storage device 130 and a processing circuit 140.

FIG. 4 is a diagram illustrating schematic configurations of the storage device 130 and the processing circuit 140.

As illustrated in FIG. 4, the storage device 130 stores a control program 131, an image acquisition program 132, a medium width detection program 133, a vertex count detection program 134, a medium length detection program 135, a shape estimation program 136, a multi-feed detection program 137, etc. Each of these programs is a functional module implemented by software operating on a processor. The processing circuit 160 reads each program stored in the storage device 130 and operates in accordance with each read program. Consequently, the processing circuit 140 functions as a control module 141, an image acquisition module 142, a medium width detection module 143, a vertex count detection module 144, a medium length detection module 145, a shape estimation module 146, and a multi-feed detection module 147.

Figure 5:
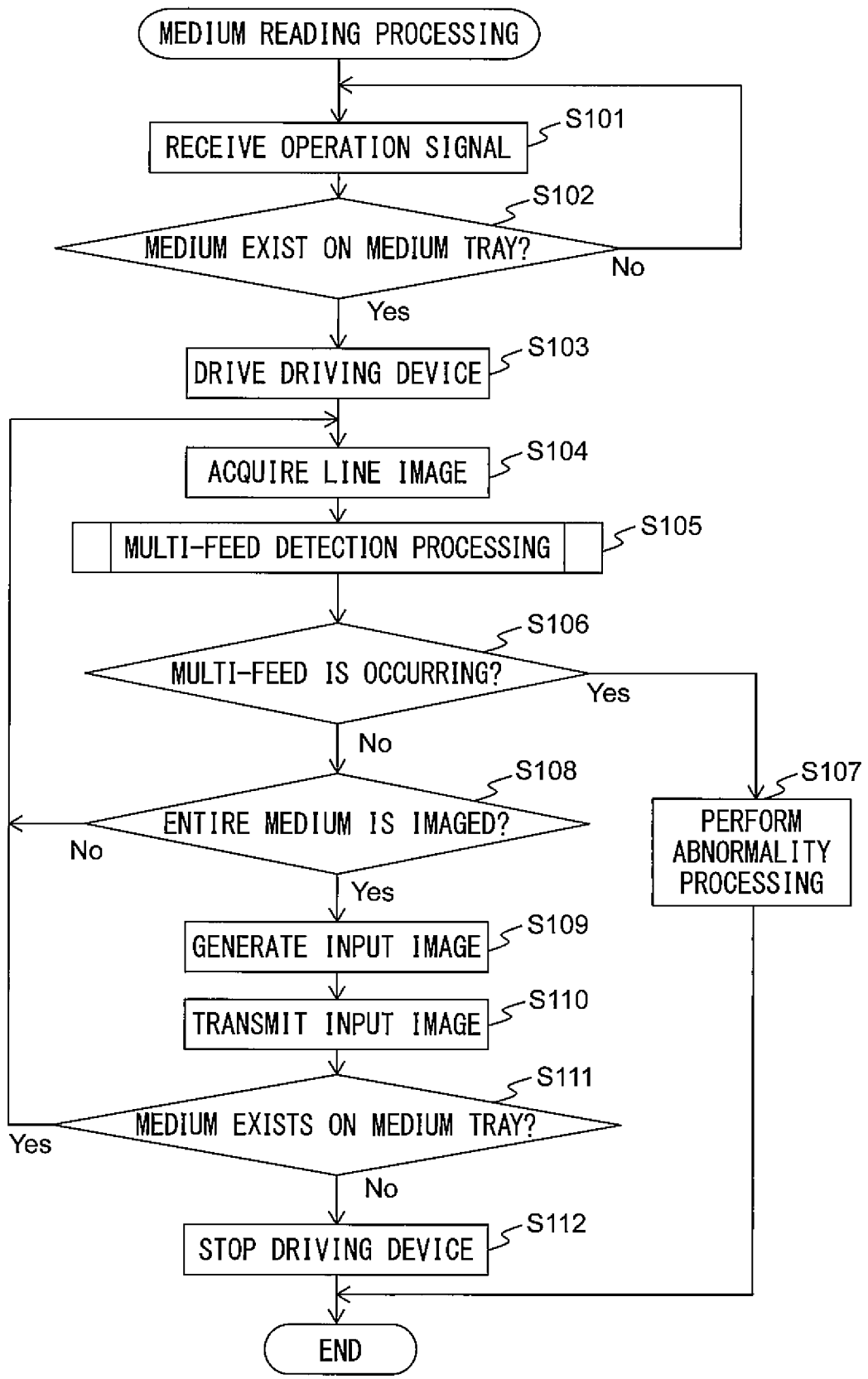
FIG. 5 is a flowchart illustrating an operation example of medium reading processing.

FIG. 5 is a flowchart illustrating an operation example of medium reading processing in the multi-feed detection apparatus 100.

Referring to the flowchart illustrated in FIG. 5, an operation example of the medium reading processing in the multi-feed detection apparatus 100 will be described below. The operation flow described below is executed mainly by the processing circuit 140 in cooperation with each element in the multi-feed detection apparatus 100, in accordance with a program previously stored in the storage device 130. The operation flow illustrated in FIG. 5 is periodically executed.

First, the control module 141 stands by until an instruction to read a medium is input by a user by use of the operation device 105, and an operation signal instructing to read the medium is received from the operation device 105 (step S101).

Next, the control module 141 determines whether or not a medium is placed on the medium tray 103, based on a medium detection signal received from the medium detection sensor 111 (step S102).

When a medium is not placed on the medium tray 103, the control module 141 returns the processing to step S101 and stands by until newly receiving an operation signal from the operation device 105.

On the other hand, when a medium is placed on the medium tray 103, the control module 161 drives the driving device 121, rotates the feed rollers 112, the brake rollers 113, and the first to fourth conveyance rollers 115, 116, 118, and 119, and feeds and conveys the medium (step S103).

Next, the image acquisition module 142 causes the imaging device 117 to image the conveyed medium and acquires a line image (step S104).

Next, the processing circuit 140 executes multi-feed detection processing (step S105). In the multi-feed detection processing, the multi-feed detection module 147 detects media multi-feed by comparing an ultrasonic signal generated by the ultrasonic sensor 114 with a determination threshold value. Further, the shape estimation module 146 estimates a shape of the medium based on the line image, and the multi-feed detection module 147 changes the determination threshold value or stops detection of media multi-feed, based on the estimated shape of the medium. Details of the multi-feed detection processing will be described later.

Next, the control module 141 determines whether or not media multi-feed is detected, that is, whether or not occurrence of media multi-feed is determined, in the multi-feed detection processing (step S106).

When media multi-feed is detected, the control module 141 stops the driving device 121 and stops conveyance of media, and also notifies occurrence of abnormality to a user by an unillustrated speaker, LED, etc., as abnormality processing (step S107) and ends the series of steps.

On the other hand, when media multi-feed is not detected, the image acquisition module 142 determines whether or not the entire conveyed medium is imaged (step S108). For example, the image acquisition module 142 determines whether or not the entire medium is imaged, by determining whether or not the rear edge of the medium passes the imaging device 117 based on a medium detection signal output from an unillustrated medium detection sensor provided on the downstream side of the imaging device 117. The image acquisition module 142 may determine that the entire conveyed medium is imaged when acquiring a predetermined number of line images from the imaging device 117.

When the entire conveyed medium is not yet imaged, the image acquisition module 142 returns the processing to step S104 and repeats the processing in steps S104 to S108.

On the other hand, when the entire conveyed medium is imaged, the image acquisition module 142 generates an input image by combining all the acquired line images (step S109).

Next, the image acquisition module 142 transmits the input image to the unillustrated information processing device through the interface device 122 (step S110). When not being connected to the information processing device, the image acquisition module 142 stores the input image in the storage device 130.

Next, the control module 141 determines whether or not a medium remains on the medium tray 103 based on a medium detection signal received from the medium detection sensor 111 (step S111). When a medium remains on the medium tray 103, the control module 141 returns the processing to step S104 and repeats the processing in steps S104 to S111.

On the other hand, when a medium does not remain on the medium tray 103, the control module 141 stops the driving device 121 (step S112) and ends the series of steps.

Figure 6:
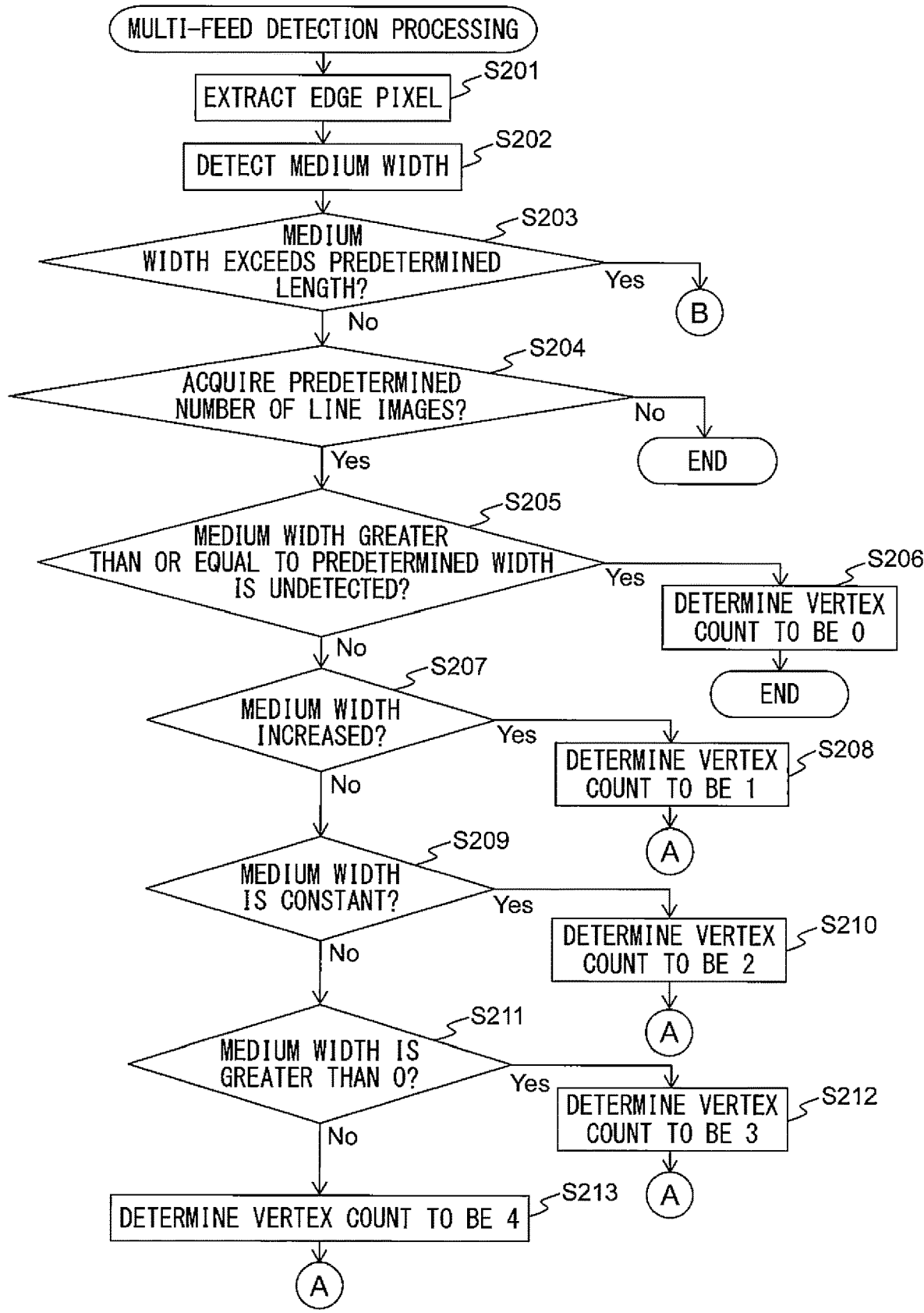
FIG. 6 is a flowchart illustrating an operation example of multi-feed detection processing.
Figure 7:
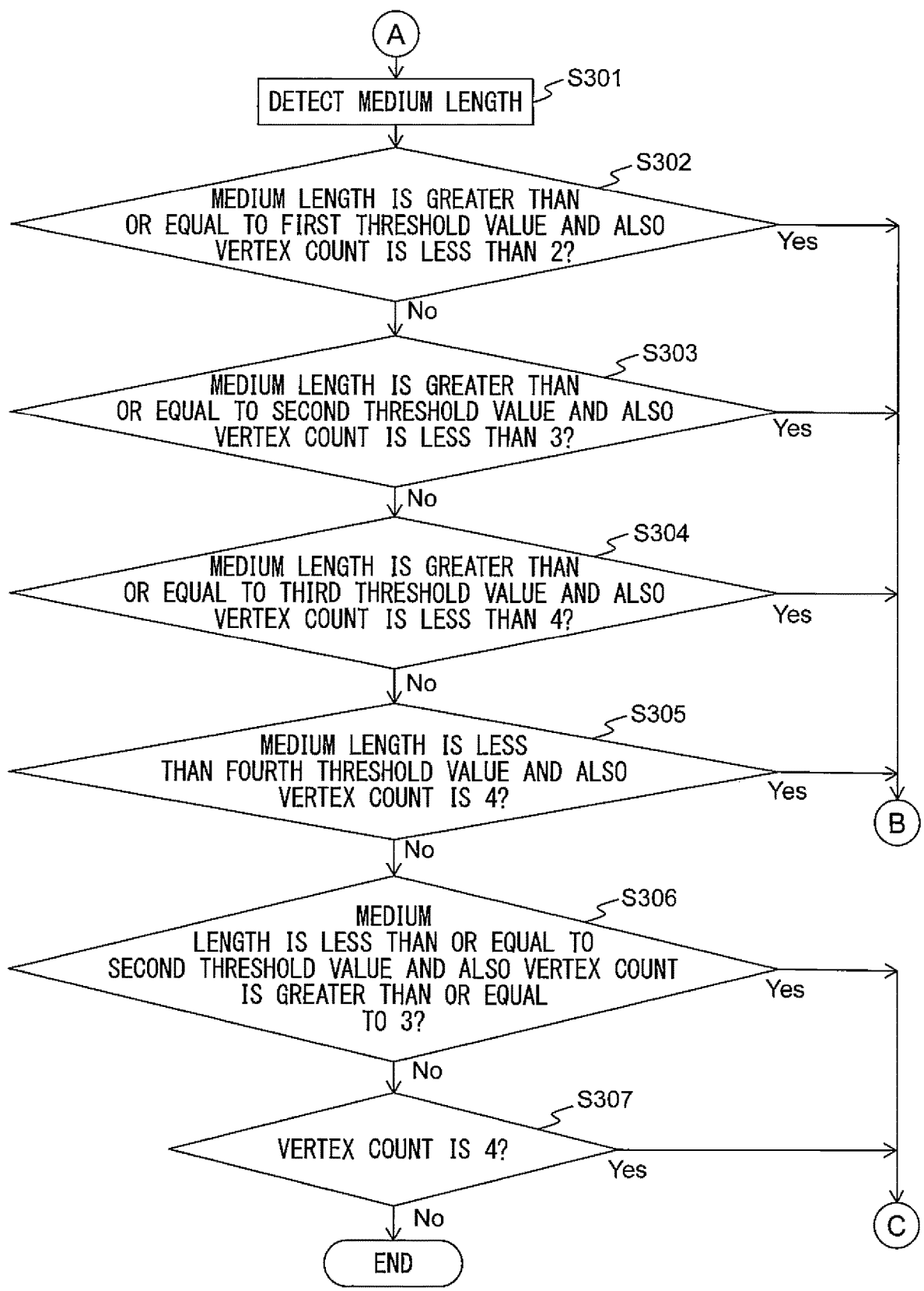
FIG. 7 is a flowchart illustrating the operation example of the multi-feed detection processing.
Figure 8:
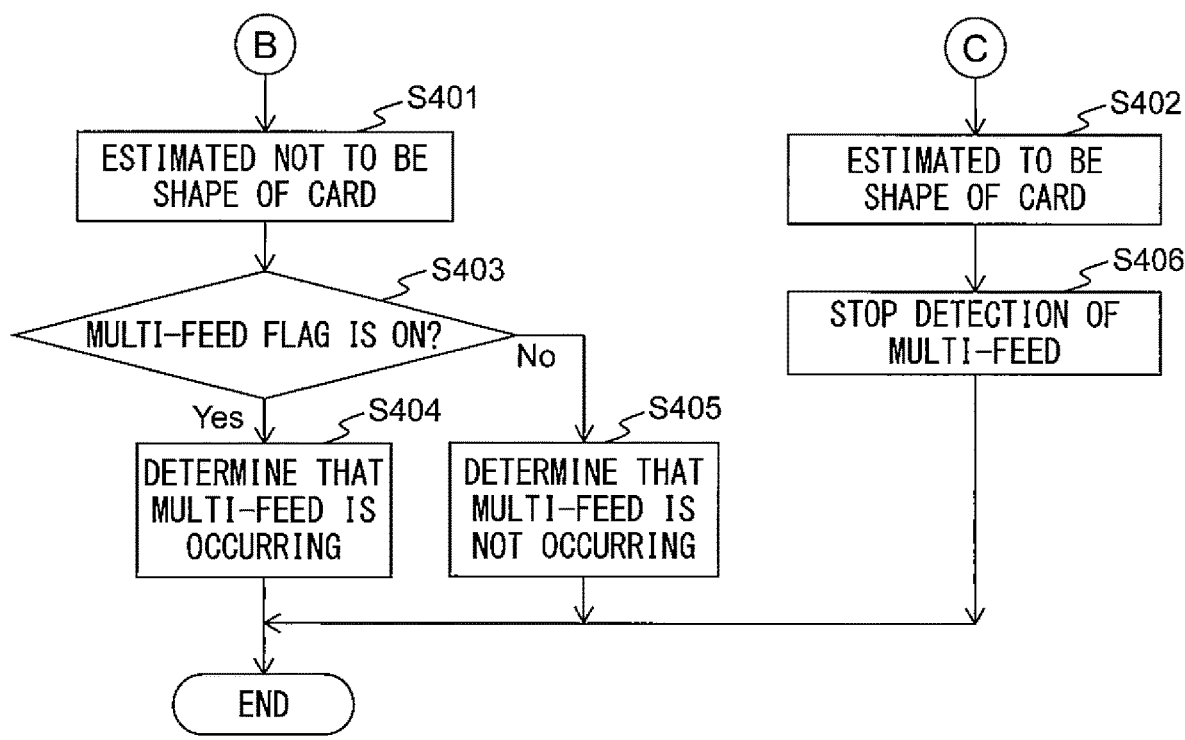
FIG. 8 is a flowchart illustrating the operation example of the multi-feed detection processing.

FIG. 6 to FIG. 8 are a flowchart illustrating an operation example of the multi-feed detection processing.

The operation flow illustrated in FIG. 6 to FIG. 8 is executed in step S105 in the flowchart illustrated in FIG. 5.

First, the medium width detection module 143 extracts an edge pixel from a line image acquired by the image acquisition module 142 (step S201). Specifically, the medium width detection module 143 extracts an edge pixel for each of sequentially generated line images. The medium width detection module 143 calculates an absolute value of the difference between brightness values of both of pixels adjacent to each pixel in a line image in a horizontal direction (hereinafter referred to as an adjacent difference value) and when the adjacent difference value exceeds a threshold value Th1, extracts the pixel as an edge pixel. For example, the threshold value Th1 may be set to a difference in brightness value (for example, 20) according to which a person may determine a difference in brightness on an image by visual observation.

The medium width detection module 143 may calculate an absolute value of the difference between brightness values of two pixels apart from each pixel in a line image by a predetermined distance as an adjacent difference value. Further, the medium width detection module 143 may calculate an adjacent difference value by use of a color value (an R value, a G value, or a B value) of each pixel in place of a brightness value of each pixel. Further, the medium width detection module 143 may extract an edge pixel by comparing a brightness value or a color value of a line image with a threshold value. For example, when a brightness value or a color value of a specific pixel is less than a threshold value and a brightness value or a color value of a pixel adjacent to the specific pixel or a pixel apart from the specific pixel by a predetermined distance is greater than or equal to the threshold value, the medium width detection module 143 determines the specific pixel to be an edge pixel.

Next, the medium width detection module 143 detects a width of the medium in a line image acquired by the image acquisition module 142, based on the extracted edge pixel, and stores the medium width into the storage device 130 (step S202). The width of the medium may be hereinafter referred to as a medium width. In other words, for each sequentially generated line image, the medium width detection module 143 detects a medium width in the line image. The medium width detection module 143 specifies an edge pixel positioned most leftward and an edge pixel positioned most rightward out of edge pixels extracted from a line image and detects a distance (pixel count) between the specified edge pixels as a medium width.

Next, the shape estimation module 146 determines whether or not the detected medium width exceeds a predetermined length (step S203). For example, the predetermined length is set based on a size of an ID card defined by ISO/IEC 7810. An ID card defined by ISO/IEC 7810 has an almost rectangular shape with a long side being 85.60 mm and a short side being 53.98 mm. An angle of each of four vertexes of the ID, card may not be a right angle and may have roundness. For example, the predetermined length is set to a pixel count corresponding to a value (for example, 102 mm) acquired by adding a margin to a length (101.20 mm) of a diagonal line of the ID card. Regardless how the ID card is conveyed in a tilted manner, a width of an ID card imaged at an image line of the imaging device 117 does not exceed the defined length of the diagonal line.

Accordingly, when a detected medium width exceeds the predetermined length, that is, when the medium width detection module 143 detects a medium width exceeding the predetermined length from a line image, the shape estimation module 146 estimates that the shape of the conveyed medium is not a shape of a card (step S401). In this case, in processing to be described later, the vertex count detection module 144 does not detect a vertex count of the medium included in sequentially generated line images. Consequently, the shape estimation module 146 can estimate the shape of the medium in a short period and can lighten a processing load of the multi-feed detection processing.

On the other hand, when the detected medium width does not exceed the predetermined length, the vertex count detection module 144 determines whether or not a predetermined number of line images on which detection processing of a vertex count of a medium is not executed are newly acquired (step S204). The predetermined number is set to a pixel count (for example, 3) by which a change in a medium width in a subscanning direction can be satisfactorily detected. The predetermined number may be 1. When the predetermined number of line images are not newly acquired, the vertex count detection module 144 ends the series of steps. In other words, processing in subsequent steps S205 to S406 is executed every time the predetermined number of line images are newly generated.

On the other hand, when the predetermined number of line images are newly acquired, the vertex count detection module 144 determines whether or not a medium width greater than or equal to a predetermined width is detected in any of line images of the medium acquired up to the present (step S205). For example, the predetermined width is set to 1 pixel. The predetermined width may be set to a value greater than or equal to 2 pixels in order to eliminate an effect of noise.

When a medium width greater than or equal to the predetermined width is not yet detected, the vertex count detection module 144 determines that a vertex count of the medium included in the line images acquired up to the present is 0 (step S206) and ends the series of steps.

On the other hand, when a medium width greater than or equal to the predetermined width is detected, the vertex count detection module 144 detects a change in a medium width in each line image. The vertex count detection module 144 specifies the latest line image out of the newly acquired predetermined number of line images as a target image and specifies a line image acquired immediately before acquiring the predetermined number of line images as a reference image. The vertex count detection module 144 may use, as a reference image, an image having an average or a median of gradient values of corresponding pixels in a plurality of line images acquired immediately before acquiring the predetermined number of line images as a gradient value of each pixel. Consequently, the vertex count detection module 144 can improve reliability of the reference image.

The vertex count detection module 144 determines whether or not a medium width in the target image is greater than a medium width in the reference image (step S207). The vertex count detection module 144 may determine that the medium width in the target image is greater than the medium width in the reference image only when the medium width in the target image is greater than the medium width in the reference image and also the difference between the medium width in the target image and the medium width in the reference image is greater than or equal to a predetermined difference (for example, 3 pixels).

When the medium width in the target image is greater than the medium width in the reference image, the vertex count detection module 144 determines that a vertex count of the medium included in line images acquired up to the present is 1 (step S208) and moves the processing to step S301.

FIG. 9A to FIG. 9F and FIG. 10 are schematic diagrams for illustrating a relation between a change in a medium width and a vertex count.

FIG. 9A to FIG. 9F illustrate a medium M having a rectangular shape and being conveyed in a tilted manner. As illustrated in FIG. 9A to FIG. 9F, the medium M may be conveyed in a tilted manner and when the medium M is conveyed in a tilted manner, vertexes V1 to V4 of the medium M pass an imaging position of the imaging device 117 at timings different from one another, respectively. FIG. 10 illustrates a plurality of line images P0 to P9 imaged while the medium M is conveyed. While FIG. 10 displays only the plurality of line images P0 to P9 for ease of description, a large number of line images are imaged while the respective line images are imaged.

Figure 9A:
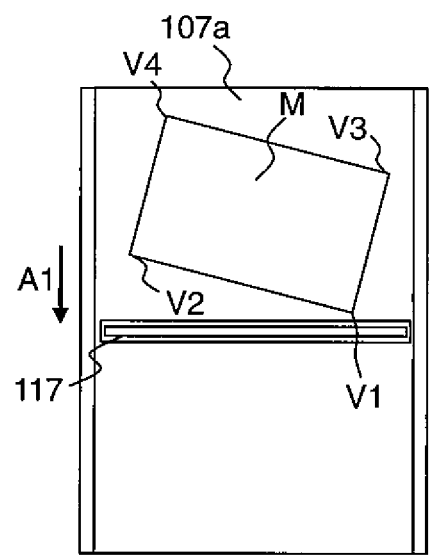
FIG. 9A is a schematic diagram for illustrating a relation between a change in a medium width and a vertex count.
Figure 9B:
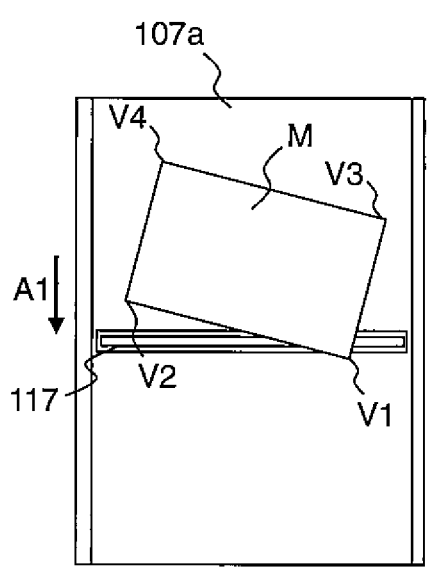
FIG. 9B is a schematic diagram for illustrating the relation between a change in a medium width and a vertex count.
Figure 9C:
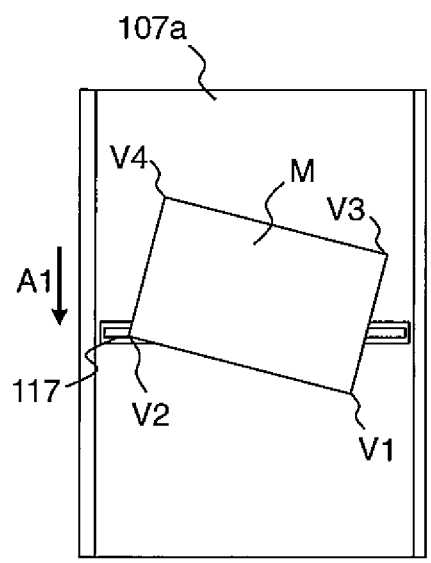
FIG. 9C is a schematic diagram for illustrating the relation between a change in a medium width and a vertex count.
Figure 9D:
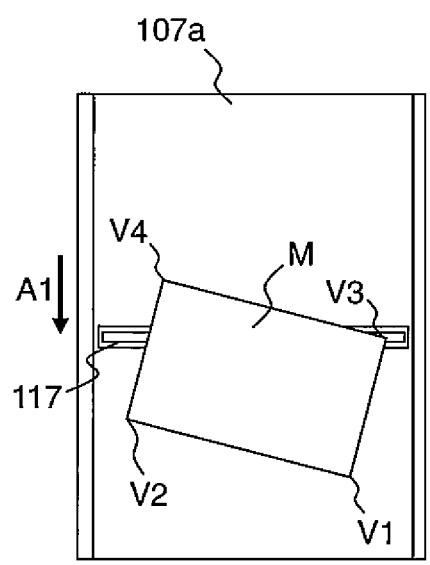
FIG. 9D is a schematic diagram for illustrating the relation between a change in a medium width and a vertex count.
Figure 9E:
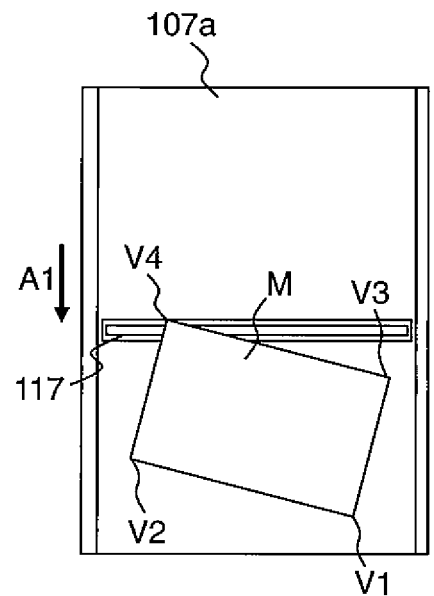
FIG. 9E is a schematic diagram for illustrating the relation between a change in a medium width and a vertex count.
Figure 9F:
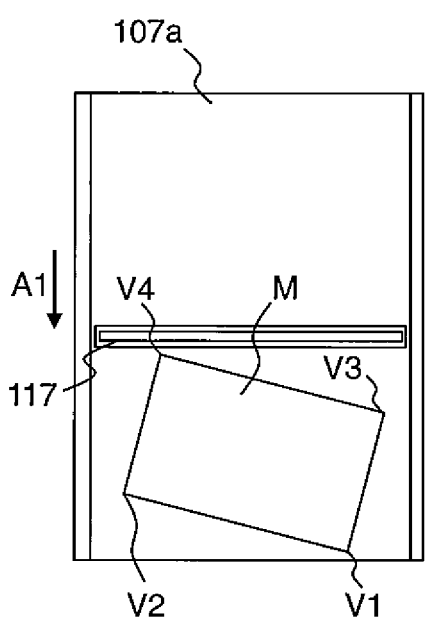
FIG. 9F is a schematic diagram for illustrating the relation between a change in a medium width and a vertex count.

FIG. 9A illustrates the medium M in a state in which none of the vertexes reach the imaging position yet, and the line image P0 in FIG. 10 is imaged at this timing. FIG. 9B illustrates the medium M immediately after a first vertex V1 passes the imaging position, and the line image P1 in FIG. 10 is imaged at this timing. FIG. 9C illustrates the medium M in a state in which a second vertex V2 reaches the imaging position, and the line image P3 in FIG. 10 is imaged at this timing. FIG. 9D illustrates the medium M in a state in which a third vertex V3 reaches the imaging position, and the line image P6 in FIG. 10 is imaged at this timing. FIG. 9E illustrates the medium M immediately before a fourth vertex V4 reaches the imaging position, and the line image P8 in FIG. 10 is imaged at this timing. FIG. 9F illustrates the medium M in a state in which every vertex passes the imaging position, and the line image P9 in FIG. 10 is imaged at this timing.

As illustrated in FIG. 10, line images from a line image imaged immediately before the line image P1 to a line image imaged immediately before the line image P3 include only one vertex V1. In these line images, a distance D between edge pixels L and R at both ends is greater in a more newly imaged line image. In other words, when the medium width in the target image is greater than the medium width in the reference image, the vertex count detection module 144 may determine that a vertex count of the medium included in line images acquired up to the present is 1.

On the other hand, when the medium width in the target image is not greater than the medium width in the reference image, the vertex count detection module 144 determines whether or not the medium width in the target image is equal to the medium width in the reference image (step S209). When the difference between the medium width in the target image and the medium width in the reference image is less than or equal to a predetermined difference, the vertex count detection module 144 may determine that the medium width in the target image is equal to the medium width in the reference image.

When the medium width in the target image is equal to the medium width of the reference image, the vertex count detection module 144 determines that a vertex count of the medium included in line images acquired up to the present is 2 (step S210) and moves the processing to step S301.

As illustrated in FIG. 10, line images from the line image imaged immediately before the line image P1 to a line image imaged immediately before the line image P6 include two vertexes V1 and V2. Then, in line images from a line image imaged immediately after the line image P3 to the line image imaged immediately before the line image P6, the distance D between the edge pixels L and R at both ends is the same. In other words, when the medium width in the target image is equal to the medium width in the reference image, the vertex count detection module 144 may determine that a vertex count of the medium included in line images acquired up to the present is 2.

A medium width in the line image P3 is greater than a medium width in a line image imaged immediately before, and therefore a vertex count of the medium included in line images acquired up to that time is determined to be 1. However, a medium width in a subsequently imaged line image becomes equal to the medium width in the line image P3 imaged immediately before, and a vertex count of the medium included in line images acquired up to that time is determined to be 2. Accordingly, a timing of the vertex count being correctly detected is delayed by one line pixel; however, intervals at which line images are imaged are sufficiently short, and therefore the vertex count detection module 144 can detect a vertex count with sufficiently high precision.

On the other hand, when the medium width in the target image is not equal to the medium width in the reference image, that is, when the medium width in the target image is less than the medium width in the reference image, the vertex count detection module 144 determines whether or not the medium width in the target image is greater than 0 (step S211).

When the medium width in the target image is greater than 0, that is, when the medium exists in the target image, the vertex count detection module 144 determines that a vertex count of the medium included in line images acquired up to the present is 3 (step S212) and moves the processing to step S301.

As illustrated in FIG. 10, line images from the line image imaged immediately before the line image P1 to the line image P8 include three vertexes V1, V2, and V3. Then, in line images from a line image imaged immediately after the line image P6 to the line image P8, the distance D between the edge pixels L and R at both ends is less in a more newly imaged line image, and also the medium exists. In other words, when the medium width in the target image is less than the medium width in the reference image, and also the medium exists in the target image, the vertex count detection module 144 may determine that a vertex count of the medium included in line images acquired up to the present is 3.

A medium width in the line image P6 is equal to a medium width in a line image imaged immediately before, and therefore a vertex count of the medium included in line images acquired up to that time is determined to be 2. However, a medium width in a subsequently imaged line image is less than the medium width in the line image P6 imaged immediately before, and a vertex count of the medium included in line images acquired up to that time is determined to be 3. In other words, a timing of the vertex count being correctly detected is delayed by one line pixel; however, intervals at which the line images are imaged are sufficiently short, and therefore the vertex count detection module 144 can detect a vertex count with sufficiently high precision.

On the other hand, when the medium width in the target image is 0, that is, when the medium does not exist in the target image, the vertex count detection module 144 determines that a vertex count of the medium included in line images acquired up to the present is 4 (step S213) and moves the processing to step S301.

As illustrated in FIG. 10, line images from the line image imaged immediately before the line image P1 to a line image imaged after the line image P8 include four vertexes V1, V2, V3, and V4. Then, the medium M is not included in a line image imaged after the line image P8. In other words, when the medium does not exist in the target image, the vertex count detection module 144 may determine that a vertex count of the medium included in line images acquired up to the present is 4.

Thus, the vertex count detection module 144 detects a vertex count of a medium included in sequentially generated line images based on a medium width in each line image.

Next, the medium length detection module 145 detects a length of the medium in a vertical direction (subscanning direction), that is, a direction perpendicular to a medium width, the medium being included in line images acquired up to the present with respect to the medium (step S301). The length of the medium may be hereinafter referred to as a medium length. As described above, a pixel count of a line image in the vertical direction (subscanning direction) is 1. The medium length detection module 145 detects a number of images from a line image in which a medium width greater than or equal to a predetermined width is first detected to a latest line image or a line image in which a medium width first becomes 0 with respect to the medium, as a medium length (a pixel count in the vertical direction) of the medium included in the line images. Thus, the medium length detection module 145 detects a medium length of a medium in a direction perpendicular to a medium width, the medium being included in sequentially generated line images.

Next, the shape estimation module 146 determines whether or not the medium length detected by the medium length detection module 145 is greater than or equal to a first threshold value and also the vertex count detected by the vertex count detection module 144 is less than 2 (step S302).

Figure 11A:
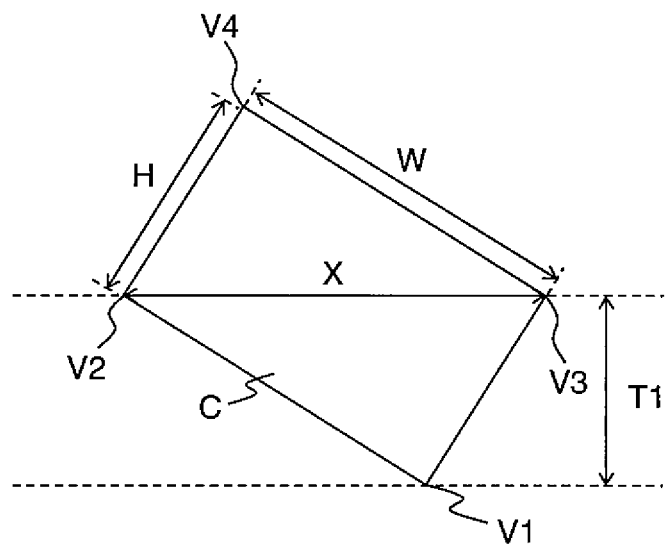
FIG. 11A is a schematic diagram for illustrating a first threshold value.

FIG. 11A is a schematic diagram for illustrating the first threshold value.

For example, as illustrated in FIG. 11A, the first threshold value is set to a pixel count corresponding to a value (for example, 46 mm) acquired by adding a margin to a distance T1 (45.66 mm) between a diagonal line X of an ID card C defined by ISO/IEC 7810 and a vertex not included in the diagonal line X. The distance T1 is calculated by solving the following relational equations (1) and (2) where a long side of the ID card C is denoted as W (85.60 mm) and a short side is denoted as H (53.98 mm).

$$H^2 + W^2 = X^2 \tag{1}$$

$$H \times W = X \times T1 \tag{2}$$

Next, when the medium length is greater than or equal to the first threshold value and also the vertex count is less than 2, the shape estimation module 146 estimates that the shape of the medium is not a shape of a card (step S401).

In a case of an ID card C being conveyed, regardless of how the ID card C is tilted, at least either of a vertex V2 or a vertex V3 each sharing a side with a vertex V1 always passes the imaging position when the ID card C is further conveyed by the distance T1 after the vertex V1 passes the imaging position. Consequently, when the medium length detected by the medium length detection module 145 is greater than or equal to the first threshold value and also the vertex count detected by the vertex count detection module 144 is less than 2, the shape estimation module 146 may determine that the medium is a medium larger than the card.

On the other hand, when the medium length is less than the first threshold value and also the vertex count is greater than or equal to 2, the shape estimation module 146 determines whether or not the medium length is greater than or equal to a second threshold value and also the vertex count is less than 3 (step S303).

Figure 11B:
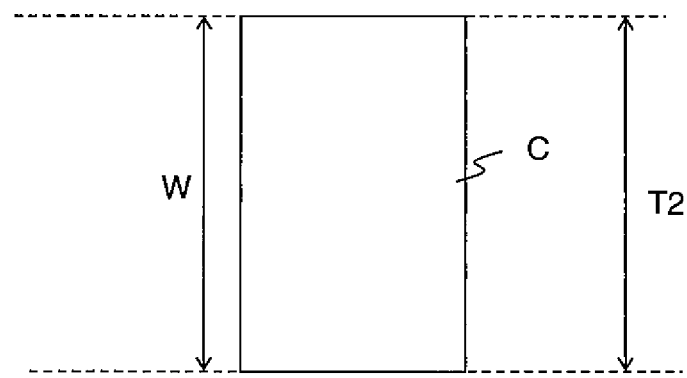
FIG. 11B is a schematic diagram for illustrating a second threshold value.

FIG. 11B is a schematic diagram for illustrating the second threshold value.

For example, as illustrated in FIG. 11B, the second threshold value is set to a pixel count corresponding to a value (for example, 86 mm) acquired by adding a margin to a length T2 (85.60 mm) of the long side W of the ID card C defined by ISO/IEC 7810.

Next, when the medium length is greater than or equal to the second threshold value and also the vertex count is less than 3, the shape estimation module 146 estimates that the shape of the medium is not a shape of a card (step S401).

In a case of an ID card C being conveyed, regardless of how the ID card C is conveyed, both of the vertex V2 and the vertex V3 each sharing a side with the vertex V1 always passes the imaging position when the ID card C is further conveyed by the distance T2 after the vertex V1 passes the imaging position. Consequently, when the medium length detected by the medium length detection module 145 is greater than or equal to the second threshold value and also the vertex count detected by the vertex count detection module 144 is less than 3, the shape estimation module 146 may determine that the medium is a medium larger than the card.

On the other hand, when the medium length is less than the second threshold value or the vertex count is greater than or equal to 3, the shape estimation module 146 determines whether or not the medium length is greater than or equal to a third threshold value and also the vertex count is less than 4 (step S304).

Figure 11C:
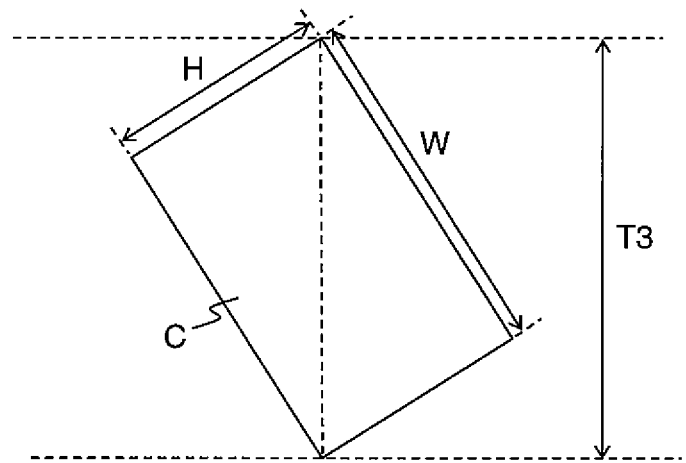
FIG. 11C is a schematic diagram for illustrating a third threshold value.

FIG. 11C is a schematic diagram for illustrating the third threshold value.

For example, as illustrated in FIG. 11C, the third threshold value is set to a pixel count corresponding to a value (for example, 102 mm) acquired by adding a margin to a length T3 (101.20 mm) of the diagonal line X of the ID card C defined by ISO/IEC 7810.

Next, when the medium length is greater than or equal to the third threshold value and also the vertex count is less than 4, the shape estimation module 146 estimates that the shape of the medium is not a shape of a card (step S401).

In a case of an ID card C being conveyed, regardless of how the ID card C is tilted, all the other vertexes V2 to V4 pass the imaging position before the ID card C is conveyed by the distance T3 after the vertex V1 passes the imaging position. Consequently, when the medium length detected by the medium length detection module 145 is greater than or equal to the third threshold value and also the vertex count detected by the vertex count detection module 144 is not 4, the shape estimation module 146 may determine that the medium is a medium larger than the card.

On the other hand, when the medium length is less than the third threshold value or the vertex count is 4, the shape estimation module 146 determines whether or not the medium length is less than a fourth threshold value and also the vertex count is 4 (step S305).

Figure 11D:
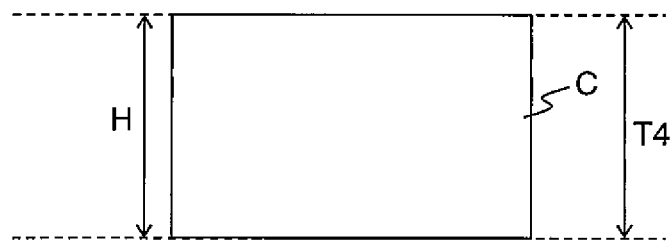
FIG. 11D is a schematic diagram for illustrating a fourth threshold value.

FIG. 11D is a schematic diagram for illustrating the fourth threshold value.

For example, as illustrated in FIG. 11D, the fourth threshold value is set to a pixel count corresponding to a value (for example, 53 mm) acquired by subtracting a margin from a length T4 (53.98 mm) of the short side H of the ID card C defined by ISO/IEC 7810.

Next, when the medium length is less than the fourth threshold value and also the vertex count is 4, the shape estimation module 146 estimates that the shape of the medium is not a shape of a card (step S401).

In a case of an ID card C being conveyed, regardless of how the ID card C is conveyed, not all the other vertexes V2 to V4 pass the imaging position before the ID card C is conveyed by the distance T4 after the vertex V1 passes the imaging position. Consequently, when the medium length detected by the medium length detection module 145 is less than the fourth threshold value and also the vertex count detected by the vertex count detection module 144 is 4, the shape estimation module 146 may determine that the medium is a medium smaller than the card.

On the other hand, when the medium length is greater than the fourth threshold value or the vertex count is less than 4, the shape estimation module 146 determines whether or not the medium length is less than or equal to the second threshold value and also the vertex count is greater than or equal to 3 (step S306).

Next, when the medium length is less than or equal to the second threshold value and also the vertex count is greater than or equal to 3, the shape estimation module 146 estimates that the shape of the medium is a shape of a card (step S402).

As illustrated in FIG. 11D, in a case of an ID card C being conveyed, regardless of how the ID card C is conveyed, both of the vertex V2 and the vertex V3 each sharing a side with the vertex V1 always pass the imaging position when the ID card C is further conveyed by the distance T2 after the vertex V1 passes the imaging position. Consequently, when the detected medium length is less than or equal to the second threshold value and also the detected vertex count is greater than or equal to 3, the shape estimation module 146 may determine that the medium is a medium having a size equal to the size of the card or a medium smaller than the card. In general, it is not likely that a medium smaller than the card is conveyed, and therefore the medium is estimated to be a card.

On the other hand, when the medium length is less than the second threshold value or the vertex count is less than 3, the shape estimation module 146 determines whether or not the vertex count is 4 (step S307).

Next, when the vertex count is 4, the shape estimation module 146 estimates that the shape of the medium is a shape of a card (step S402).

When all the vertexes pass the imaging position without satisfying each of the conditions in aforementioned steps S302 to S307, the shape estimation module 146 may determine that the medium is a medium having a size equal to the size of the card or a medium smaller than the card. In general, it is not likely that a medium smaller than the card is conveyed, and therefore the medium is estimated to be a card.

On the other hand, when the vertex count is less than or equal to 4, the shape estimation module 146 determines that the shape of the medium may not yet be estimated and ends the series of steps.

Thus, the shape estimation module 146 estimates the shape of the medium based on a vertex count detected by the vertex count detection module 144 and a medium length in the medium conveying direction detected by the medium length detection module 145. By estimating the shape of the medium based on a vertex count and a medium length in the medium conveying direction, the shape estimation module 146 can estimate with high precision whether or not the medium is a card, even when the medium is conveyed in a tilted manner. Further, the shape estimation module 146 can estimate the shape of the medium without executing complicated image processing and can suppress increase in a processing load of the multi-feed detection processing.

Further, with respect to sequentially generated line images, the shape estimation module 146 estimates the shape of the medium in real time every time a predetermined number of line images are generated and therefore can estimate the shape of the medium before the entire medium is imaged. Particularly, the shape estimation module 146 can estimate the shape of the medium early when a medium other than a card is conveyed, and therefore the multi-feed detection module 147 can execute the multi-feed detection processing, to be described later, early on a medium other than a card. On the other hand, the shape estimation module 146 does not estimate the shape of the medium to be a shape of a card until a characteristic specific to a card is detected and therefore can prevent mistakenly estimating a medium as a card even when a long document such as a receipt is conveyed in a longitudinal direction.

When the shape estimation module 146 estimates that the shape of the medium is not a shape of a card (step S401), the multi-feed detection module 147 determines whether or not a multi-feed flag is ON (step S403). The multi-feed flag is set to OFF at a start of reading for each medium and is set to ON when a signal value of an ultrasonic signal is determined to be less than or equal to a determination threshold value in ultrasonic signal determination processing to be described later.

When the multi-feed flag is ON, the multi-feed detection module 147 determines that media multi-feed is occurring (step S404), sets the multi-feed flag to OFF, and ends the series of steps. On the other hand, when the multi-feed flag is OFF, the multi-feed detection module 147 determines that media multi-feed is not occurring (step S405) and ends the series of steps. Thus, the multi-feed detection module 147 detects media multi-feed of conveyed media.

On the other hand, when the shape estimation module 146 estimates that the shape of the medium is a shape of a card (step S402), the multi-feed detection module 147 stops detection of the media multi-feed (step S406) and ends the series of steps. Thus, the multi-feed detection module 147 stops detection of the media multi-feed based on the estimated shape of a medium.

Figure 12:
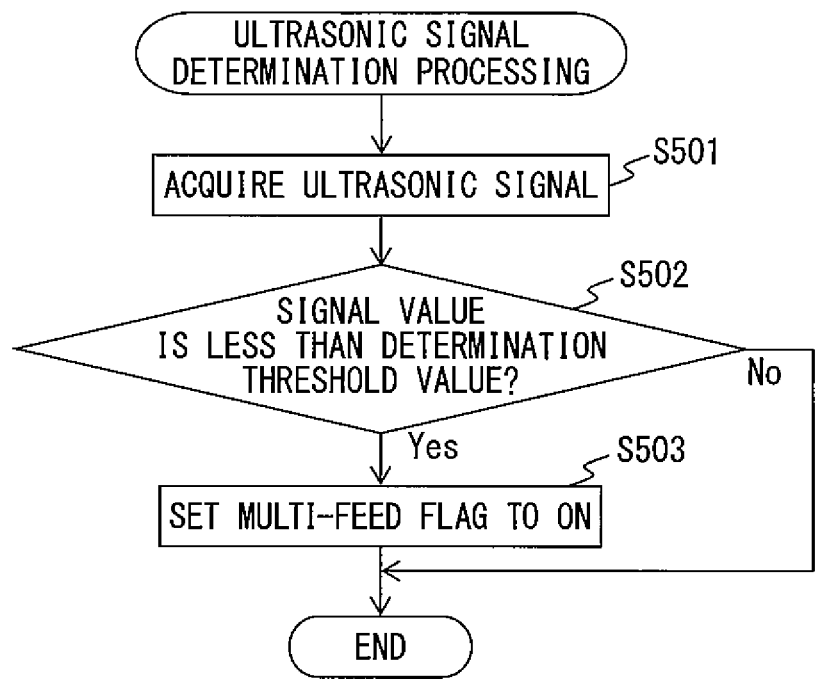
FIG. 12 is a flowchart illustrating an operation example of ultrasonic signal determination processing.

FIG. 12 is a flowchart illustrating an operation example of the ultrasonic signal determination processing.

Referring to the flowchart illustrated in FIG. 12, an operation example of the ultrasonic signal determination processing in the multi-feed detection apparatus 100 will be described below. The operation flow described below is executed mainly by the processing circuit 140 in cooperation with each element in the multi-feed detection apparatus 100, in accordance with a program previously stored in the storage device 130. The flowchart illustrated in FIG. 12 is periodically executed during medium conveyance.

First, the multi-feed detection module 147 acquires an ultrasonic signal from the ultrasonic sensor 114 (step S501).

Next, the multi-feed detection module 147 determines whether or not a signal value of the acquired ultrasonic signal is less than a determination threshold value (step S502).

Figure 13:
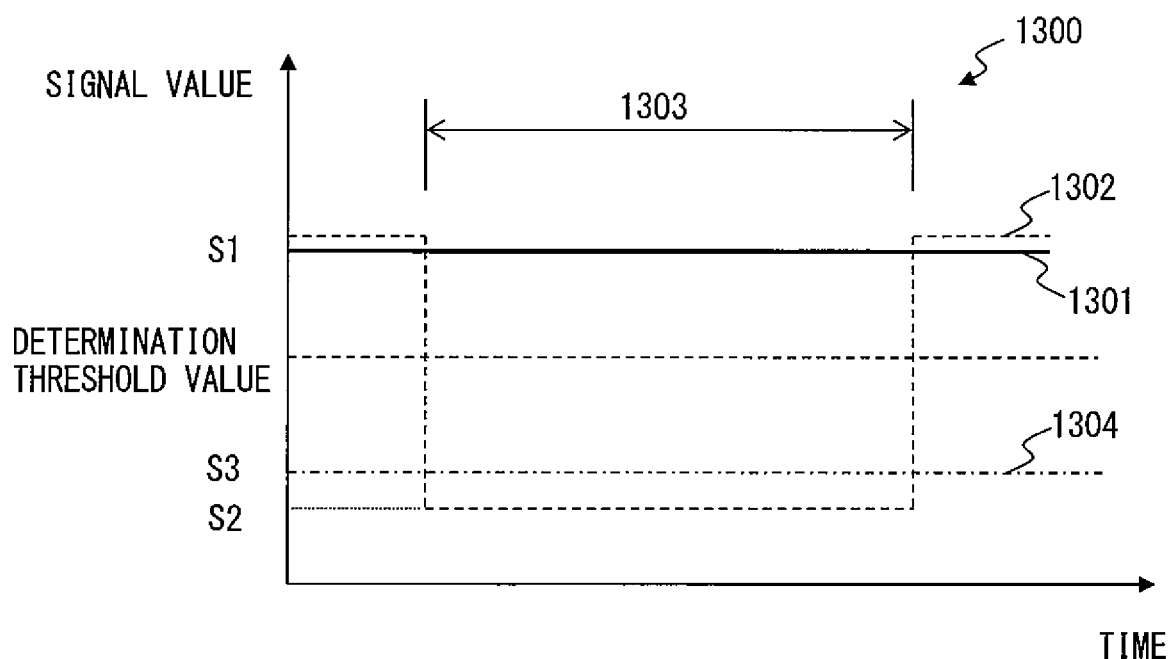
FIG. 13 is a schematic diagram for illustrating a characteristic of an ultrasonic signal.

FIG. 13 is a schematic diagram for illustrating a characteristic of an ultrasonic signal.

In a graph 1300 in FIG. 13, a solid line 1301 represents a characteristic of an ultrasonic signal when one sheet of paper is conveyed as a medium, and a dotted line 1302 represents a characteristic of an ultrasonic signal when multi-feed of paper is occurring. The horizontal axis of the graph 1300 indicates time, and the vertical axis indicates a signal value of an ultrasonic signal. Due to occurrence of multi-feed, a signal value of the ultrasonic signal in the dotted line 1302 declines in a section 1303. The determination threshold value is set to a value between a signal value S1 of an ultrasonic signal when one sheet of paper is conveyed and a signal value S2 of an ultrasonic signal when multi-feed of paper is occurring. By determining whether or not a signal value of an ultrasonic signal is less than the determination threshold value, the multi-feed detection module 163 can determine whether or not multi-feed of a medium is occurring.

On the other hand, a dot-and-dash line 1304 represents a characteristic of an ultrasonic signal when only one card thicker than paper is conveyed. When a card is conveyed, a signal value of the ultrasonic signal is less than the determination threshold value, and therefore the multi-feed detection module 147 mistakenly determines that multi-feed of media is occurring. Particularly, a signal value of an ultrasonic signal when multi-feed of thin paper is occurring is close to a signal value of the ultrasonic signal when a card is conveyed, and it is difficult to set the determination threshold value to a value between the two signal values. However, the multi-feed detection module 147 stops detection of multi-feed when the shape of the medium is estimated to be a shape of a card and therefore can prevent a detection error of multi-feed of media.

When the signal value of the ultrasonic signal is less than the determination threshold value, the multi-feed detection module 147 sets the multi-feed flag to ON (step S503) and ends the series of steps. On the other hand, when the signal value of the ultrasonic signal is greater than or equal to the determination threshold value, the multi-feed detection module 147 does not particularly execute processing and ends the series of steps. Thus, by comparing an ultrasonic signal with the determination threshold value, the multi-feed detection module 147 detects the media multi-feed. The determination threshold value is an example of the predetermined threshold value.

As described in detail above, by operating in accordance with the flowcharts illustrated in FIG. 5 to FIG. 8 and FIG. 12, the multi-feed detection apparatus 100 stops detection of the media multi-feed based on the shape of the medium. Consequently, the multi-feed detection apparatus 100 can prevent a detection error of the media multi-feed. Further, the multi-feed detection apparatus 100 estimates the shape of the medium based on a medium length and a vertex count of the medium included in sequentially generated line images. Consequently, the multi-feed detection apparatus 100 can estimate the shape of the medium before the entire medium is imaged and can estimate the shape of the medium early. Accordingly, the multi-feed detection apparatus 100 can detect the media multi-feed earlier while preventing a detection error of the media multi-feed.

Further, a user does not need to set the multi-feed detection function to OFF for preventing erroneous detection of occurrence of the media multi-feed when causing the multi-feed detection apparatus 100 to convey a medium being a card, and therefore the multi-feed detection apparatus 100 can improve user convenience.

Further, the multi-feed detection apparatus 100 can detect whether or not a medium is a card without using a special sensor such as a thickness sensor and therefore can suppress increase in a device cost.

Figure 14:
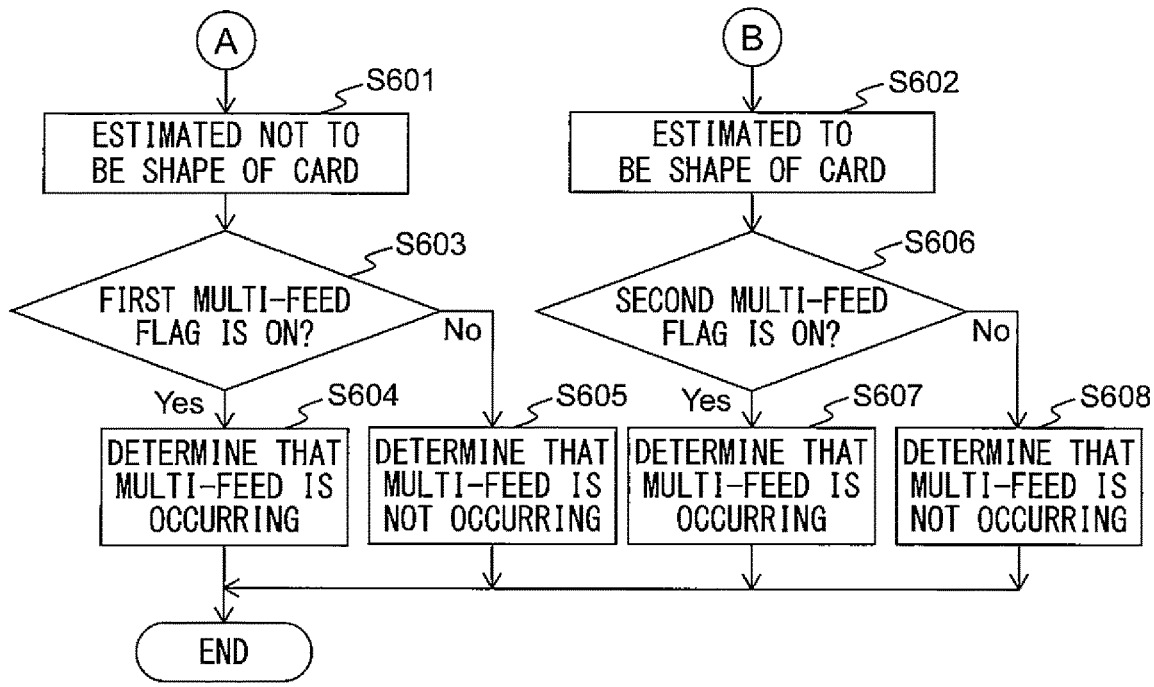
FIG. 14 is a flowchart illustrating an operation example of part of other multi-feed detection processing.

FIG. 14 is a flowchart illustrating an operation example of part of multi-feed detection processing according to another embodiment.

The processing illustrated in FIG. 14 is executed in place of the processing illustrated in FIG. 8. Similarly to the processing illustrated in FIG. 8, the processing illustrated in FIG. 14 is executed following the processing illustrated in FIG. 6 and FIG. 7.

When the shape estimation module 146 estimates that the shape of the medium is not a shape of a card (step S601), the multi-feed detection module 147 determines whether or not a first multi-feed flag is ON (step S603). The first multi-feed flag is set to OFF at a start of reading for each medium and is set to ON when a signal value of an ultrasonic signal is determined to be less than or equal to a first determination threshold value in ultrasonic signal determination processing to be described later.

When the first multi-feed flag is ON, the multi-feed detection module 147 determines that media multi-feed is occurring (step S604), sets the first multi-feed flag to OFF, and ends the series of steps. On the other hand, when the first multi-feed flag is OFF, the multi-feed detection module 147 determines that media multi-feed is not occurring (step S605) and ends the series of steps.

On the other hand, when the shape estimation module 146 estimates that the shape of the medium is a shape of a card (step S602), the multi-feed detection module 147 determines whether or not a second multi-feed flag is ON (step S606). The second multi-feed flag is set to OFF at a start of reading for each medium and is set to ON when a signal value of an ultrasonic signal is determined to be less than or equal to a second determination threshold value less than the first determination threshold value in the ultrasonic signal determination processing to be described later.

When the second multi-feed flag is ON, the multi-feed detection module 147 determines that media multi-feed is occurring (step S607), sets the second multi-feed flag to OFF, and ends the series of steps. On the other hand, when the second multi-feed flag is OFF, the multi-feed detection module 147 determines that media multi-feed is not occurring (step S608) and ends the series of steps. Thus, the multi-feed detection module 147 changes a determination threshold value for media multi-feed based on the estimated shape of the medium. Particularly, when the shape of the medium is estimated to be a shape of a card, the multi-feed detection module 147 changes the determination threshold value to a value less than a determination threshold value in a case of the shape of the medium being estimated not to be a shape of a card.

Figure 15:
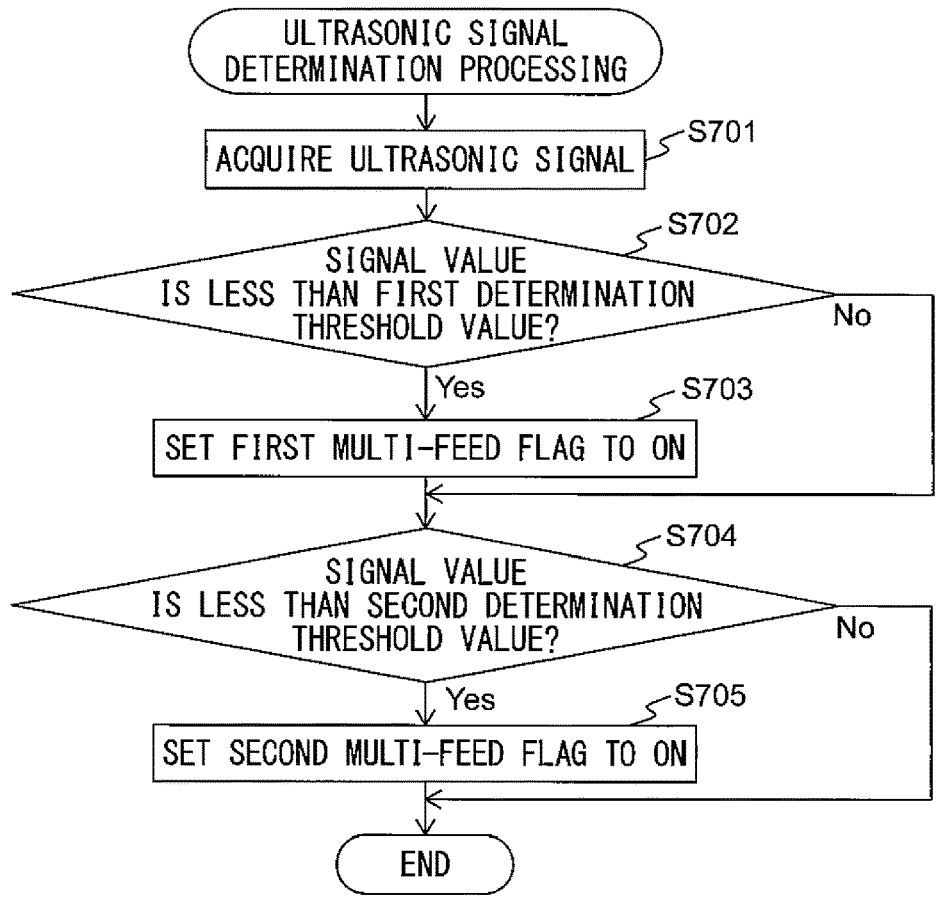
FIG. 15 is a flowchart illustrating an operation example of part of other ultrasonic signal determination processing.

FIG. 15 is a flowchart illustrating an operation example of part of ultrasonic signal determination processing according to the other embodiment.

The processing illustrated in FIG. 15 is executed in place of the processing illustrated in FIG. 12 when the processing illustrated in FIG. 14 is executed in place of the processing illustrated in FIG. 8.

First, the multi-feed detection module 147 acquires an ultrasonic signal from the ultrasonic sensor 114 (step S701).

Next, the multi-feed detection module 147 determines whether or not a signal value of the acquired ultrasonic signal is less than the first determination threshold value (step S702). Similarly to the determination threshold value used in the ultrasonic signal determination processing in FIG. 12, the first determination threshold value is set to a value between a signal value S1 of an ultrasonic signal when a sheet of paper is conveyed and a signal value S2 of the ultrasonic signal when multi-feed of paper is occurring, the signal values being illustrated in FIG. 13. In order to prevent occurrence of a detection error of media multi-feed, it is preferable that the first determination threshold value be set to a value sufficiently greater than the signal value S2 of the ultrasonic signal when multi-feed of paper is occurring. Accordingly, the first determination threshold value is set to a value greater than a signal value S3 of the ultrasonic signal when a card is conveyed.

When the signal value of the ultrasonic signal is less than the first determination threshold value, the multi-feed detection module 147 sets the first multi-feed flag to ON (step S703). On the other hand, when the signal value of the ultrasonic signal is greater than or equal to the first determination threshold value, the multi-feed detection module 147 does not particularly execute processing and moves the processing to step S704.

Next, the multi-feed detection module 147 determines whether or not the signal value of the acquired ultrasonic signal is less than the second determination threshold value (step S704). In order to allow discrimination between conveyance of a card and occurrence of multi-feed of paper, the second determination threshold value is set to a value between the signal value S3 of the ultrasonic signal when a card is conveyed and the signal value S2 of the ultrasonic signal when multi-feed of paper is occurring, the signal values being illustrated in FIG. 13.

When the signal value of the ultrasonic signal is less than the second determination threshold value, the multi-feed detection module 147 sets the second multi-feed flag to ON (step S705) and ends the series of steps. On the other hand, when the signal value of the ultrasonic signal is greater than or equal to the second determination threshold value, the multi-feed detection module 147 does not particularly execute processing and ends the series of steps.

Thus, when a medium other than a card is estimated to be conveyed, the multi-feed detection module 147 detects media multi-feed by use of the first determination threshold value set to a value greater than the signal value S3 of an ultrasonic signal when a card is conveyed. Consequently, the multi-feed detection module 147 can prevent occurrence of a detection error of media multi-feed. On the other hand, when a card is estimated to be conveyed, the multi-feed detection module 147 detects media multi-feed by use of the second determination threshold value set to a value between the signal value S3 of an ultrasonic signal when a card is conveyed and the signal value S2 of the ultrasonic signal when multi-feed of paper is occurring. Consequently, even when multi-feed of media having the same level of size as a card, such as a business card, is occurring, the multi-feed detection module 147 can correctly detect that media multi-feed is occurring. Accordingly, the multi-feed detection module 147 can determine with higher precision whether a card is being conveyed or multi-feed of paper is occurring.

As described in detail above, by operating in accordance with the flowcharts illustrated in FIG. 5 to FIG. 6 and FIG. 14 to FIG. 15, the multi-feed detection apparatus 100 changes a determination threshold value for media multi-feed based on the shape of the medium. Consequently, the multi-feed detection apparatus 100 can determine with high precision whether a card is being conveyed or multi-feed of paper is occurring while preventing a detection error of media multi-feed. Accordingly, the multi-feed detection apparatus 100 can detect media multi-feed earlier while preventing a detection error of media multi-feed.

Figure 16:
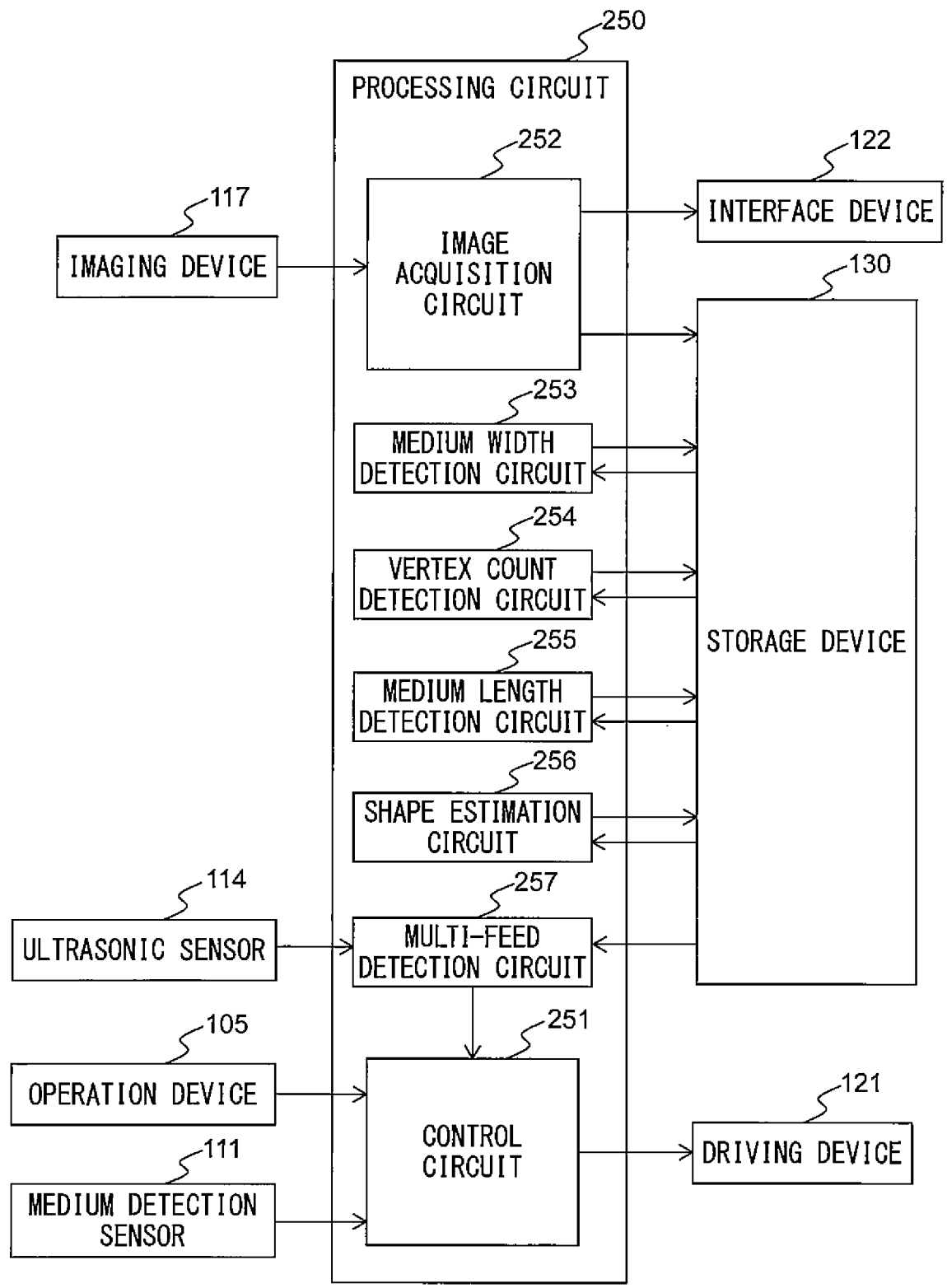
FIG. 16 is a diagram illustrating a schematic configuration of a processing circuit 250 in another multi-feed detection apparatus.

FIG. 16 is a diagram illustrating a schematic configuration of a processing circuit 250 in a multi-feed detection apparatus according to yet another embodiment. The processing circuit 250 is used in place of the processing circuit 140 in the multi-feed detection apparatus 100 and executes the medium reading processing, the multi-feed detection processing, and the ultrasonic signal determination processing in place of the processing circuit 140. The processing circuit 250 includes a control circuit 251, an image acquisition circuit 252, a medium width detection circuit 253, and a vertex count detection circuit 254, a medium length detection circuit 255, a shape estimation circuit 256, a multi-feed detection circuit 257, etc.

The control circuit 251 is an example of a control module and has a function similar to the control module 141. The control circuit 251 receives an operation signal from an operation device 105 and a medium detection signal from a medium detection sensor 111 and drives a driving device 121 according to each received signal, and also stops conveyance of media when media multi-feed is detected.

The image acquisition circuit 252 is an example of an image acquisition module and has a function similar to the image acquisition module 142. The image acquisition circuit 252 receives a line image from an imaging device 117 and stores the line image into a storage device 130, and also generates an input image from the line image and transmits the input image to an unillustrated information processing device through an interface device 122.

The medium width detection circuit 253 is an example of a medium width detection module and has a function similar to the medium width detection module 143. The medium width detection circuit 253 reads a line image from the storage device 130, detects a medium width in the line image, and stores the detection result into the storage device 130.

The vertex count detection circuit 254 is an example of a vertex count detection module and has a function similar to the vertex count detection module 144. The vertex count detection circuit 254 reads a detection result of a medium width from the storage device 130, detects a vertex count of the medium included in a line image, and stores the detection result into the storage device 130.

The medium length detection circuit 255 is an example of a medium length detection module and has a function similar to the medium length detection module 145. The medium length detection circuit 255 reads a line image from the storage device 130, detects a medium length of a medium included in the line image, and stores the detection result into the storage device 130.

The shape estimation circuit 256 is an example of a shape estimation module and has a function similar to the shape estimation module 146. The shape estimation circuit 256 reads a detection result of a vertex count and a detection result of a medium length from the storage device 130, estimates a shape of the medium based on each detection result, and stores the estimation result into the storage device 130.

The multi-feed detection circuit 257 is an example a multi-feed detection module and has a function similar to the multi-feed detection module 147. The multi-feed detection circuit 257 receives an ultrasonic signal from an ultrasonic sensor 114, detects media multi-feed, and outputs the detection result to the control circuit 251. Further, the multi-feed detection circuit 257 reads an estimation result of the shape of the medium from the storage device 130 and based on the shape of the medium, changes a determination threshold value for media multi-feed or stops detection of media multi-feed.

As described in detail above, even when using the processing circuit 250, the multi-feed detection apparatus can detect media multi-feed earlier while preventing a detection error of media multi-feed.

Each part included in the processing circuit may be independently configured with an integrated circuit, a microprocessor, firmware, etc. Further, some parts included in the processing circuit may be configured with a circuit, and other parts may be configured with a functional module implemented by software operating on a processor.

While the preferred embodiments have been described above, embodiments are not limited to the above. For example, instead of estimating whether or not the shape of a medium is a shape of an ID card defined by ISO/IEC 7810, the shape estimation module 146 may estimate whether or not the shape of the medium is another shape.

For example, the shape estimation module 146 receives a shape (for example, a length of a long side and a length of a short side of a rectangle) of a medium based on which the determination threshold value for media multi-feed is changed or a shape of a medium based on which detection of media multi-feed is stopped, the shape being specified by a user by use of the operation device 105. The shape estimation module 146 calculates a distance between a diagonal line of the medium and a vertex not included in the diagonal line based on the received length of the long side and the received length of the short side, and sets the first threshold value based on the calculated distance. Further, the shape estimation module 146 sets the second threshold value and the fourth threshold value and also calculates a length of the diagonal line, based on the received length of the long side and the received length of the short side, and sets the third threshold value based on the calculated length of the diagonal line. Consequently, the user can set a shape of a medium based on which the determination threshold value for media multi-feed is changed or a shape of a medium based on which detection of media multi-feed is stopped, and the multi-feed detection apparatus can improve user convenience.

According to this embodiment, the multi-feed detection, the method, and the computer-readable, non-transitory medium storing the control program, can detect media multi-feed earlier while preventing a detection error of media multi-feed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A multi-feed detection apparatus comprising:
a conveyance roller to convey a medium;
an ultrasonic sensor including an ultrasonic transmitter for transmitting an ultrasonic wave;
an ultrasonic receiver facing the ultrasonic transmitter for receiving the ultrasonic wave through the medium and generating an ultrasonic signal corresponding to the received ultrasonic wave;
an imaging device to image the medium being conveyed by the conveyance roller and sequentially generate a line image; and
a processor to:
detect a width of the medium in each line image,
detect a vertex count of the medium included in the sequentially generated line image based on the width of the medium in the each line image,
detect a length of the medium included in the sequentially generated line image, in a direction perpendicular to a width of the medium,
estimate a shape of the medium based on the vertex count and the length of the medium,
detect a media multi-feed by comparing the ultrasonic signal with a predetermined threshold value, and
change the predetermined threshold value or stop detection of the media multi-feed, based on the estimated shape of the medium.

2. The multi-feed detection apparatus according to claim 1, wherein the processor extracts an edge pixel for the each line image and detects the width based on the extracted edge pixel.

3. The multi-feed detection apparatus according to claim 1, wherein, when the processor detects a width of the medium exceeding a predetermined length from the line image,
the processor does not detect a vertex count of the medium included in the line image, and
the processor estimates that the shape of the medium is not a shape of a card.

4. The multi-feed detection apparatus according to claim 1, wherein, when the shape of the medium is estimated to be a shape of a card, the processor stops detection of the media multi-feed.

5. The multi-feed detection apparatus according to claim 1, wherein, when the shape of the medium is estimated to be a shape of a card, the processor changes the predetermined threshold value to a value less than a predetermined threshold value when the shape of the medium is estimated not to be a shape of a card.

6. A method for detecting media multi-feed, comprising:
conveying a medium by a conveyance roller;
transmitting an ultrasonic wave by an ultrasonic transmitter;
receiving the ultrasonic wave through the medium and generating an ultrasonic signal corresponding to the received ultrasonic wave by an ultrasonic receiver facing the ultrasonic transmitter;
generating an ultrasonic signal corresponding to a received ultrasonic wave;
imaging the medium being conveyed by the conveyance roller and sequentially generating a line image by an imaging device;
detecting a width of the medium in each line image;
detecting a vertex count of the medium included in the sequentially generated line image based on the width of the medium in the each line image;
detecting a length of the medium included in the sequentially generated line image, in a direction perpendicular to a width of the medium;
estimating a shape of the medium based on the vertex count and the length of the medium;
detecting a media multi-feed by comparing the ultrasonic signal with a predetermined threshold value; and
changing the predetermined threshold value or stopping detection of the media multi-feed, based on the estimated shape of the medium.

7. The method according to claim 6, wherein an edge pixel for the each line image is extracted and the width is detected based on the extracted edge pixel, in the width detecting step.

8. The method according to claim 6, wherein, when a width of the medium exceeding a predetermined length from the line image is detected,
a vertex count of the medium included in the line image is not detected, in the vertex count detecting step, and
the shape of the medium is estimated not to be a shape of a card, in the estimating step.

9. The method according to claim 6, wherein, when the shape of the medium is estimated to be a shape of a card, detection of the media multi-feed is stopped, in the stopping step.

10. The method according to claim 6, wherein, when the shape of the medium is estimated to be a shape of a card, the predetermined threshold value is changed to a value less than a predetermined threshold value when the shape of the medium is estimated not to be a shape of a card, in the changing step.

11. A computer-readable, non-transitory medium storing a computer program, wherein the computer program causes a multi-feed detection apparatus including a conveyance roller to convey a medium, an ultrasonic sensor including an ultrasonic transmitter for transmitting an ultrasonic wave and an ultrasonic receiver facing the ultrasonic transmitter for receiving the ultrasonic wave through the medium and generating an ultrasonic signal corresponding to the received ultrasonic wave, and an imaging device to image the medium being conveyed by the conveyance roller and sequentially generate a line image, and cause a processor to execute a process, the process comprising:

detecting a width of the medium in each line image, detecting a vertex count of the medium included in the sequentially generated line image based on the width of the medium in the each line image, detecting a length of the medium included in the sequentially generated line image, in a direction perpendicular to a width of the medium, estimating a shape of the medium based on the vertex count and the length of the medium, detecting a media multi-feed of media by comparing the ultrasonic signal with a predetermined threshold value, and changing the predetermined threshold value or stopping detection of the media multi-feed, based on the estimated shape of the medium.

12. The medium according to claim 11, wherein an edge pixel for the each line image is extracted and the width is detected based on the extracted edge pixel, in the width detecting step.

13. The medium according to claim 11, wherein, when a width of the medium exceeding a predetermined length from the line image is detected, a vertex count of the medium included in the line image is not detected, in the vertex count detecting step, and the shape of the medium is estimated not to be a shape of a card, in the estimating step.

14. The medium according to claim 11, wherein, when the shape of the medium is estimated to be a shape of a card, detection of the media multi-feed is stopped, in the stopping step.

15. The medium according to claim 11, wherein, when the shape of the medium is estimated to be a shape of a card, the predetermined threshold value is changed to a value less than a predetermined threshold value when the shape of the medium is estimated not to be a shape of a card, in the changing step.

* * * * *